(12) United States Patent
Xue et al.

(10) Patent No.: US 10,348,412 B1
(45) Date of Patent: Jul. 9, 2019

(54) METHOD AND SYSTEM FOR OPTICAL VECTOR ANALYSIS BASED ON DOUBLE-SIDEBAND MODULATION

(71) Applicant: Nanjing University of Aeronautics and Astronautics, Nanjing, Jiangsu (CN)

(72) Inventors: Min Xue, Jiangsu (CN); Yuqing Heng, Jiangsu (CN); Shilong Pan, Jiangsu (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 21 days.

(21) Appl. No.: 15/859,339

(22) Filed: Dec. 30, 2017

(30) Foreign Application Priority Data

Dec. 18, 2017 (CN) .......................... 2017 1 1361767

(51) Int. Cl.
*H04B 10/548* (2013.01)
*H04B 10/50* (2013.01)
*H04B 10/077* (2013.01)
*H04B 10/40* (2013.01)
(Continued)

(52) U.S. Cl.
CPC .......... *H04B 10/548* (2013.01); *H04B 10/07* (2013.01); *H04B 10/077* (2013.01); *H04B 10/0775* (2013.01); *H04B 10/0779* (2013.01); *H04B 10/40* (2013.01); *H04B 10/50* (2013.01); *H04B 10/505* (2013.01); *H04B 10/60* (2013.01)

(58) Field of Classification Search
None
See application file for complete search history.

(56) References Cited

U.S. PATENT DOCUMENTS

2008/0151981 A1* 6/2008 Ichiyama ......... G01R 31/31709
375/226
2015/0244402 A1* 8/2015 Ghannouchi ............ H04B 1/04
375/297

(Continued)

OTHER PUBLICATIONS

Chao He, Shilong Pan, Ronghui Guo, Yongjiu Zhao, and Minghai Pan, "Ultrafast optical frequency comb generated based on cascaded polarization modulators," Optics Letters vol. 37, No. 18, pp. 3834-3836, published on Sep. 15, 2012.

(Continued)

*Primary Examiner* — Darren E Wolf
(74) *Attorney, Agent, or Firm* — Rui Wu

(57) ABSTRACT

An apparatus comprises an optical signal generator configured to provide a first radiation comprising a first nominal carrier frequency and a second nominal carrier frequency, and provide a second radiation comprising a third nominal carrier frequency and a fourth nominal carrier frequency; an optical to electrical converter coupled to the optical signal generator and configured to: generate a first electrical current based on the first radiation and the second radiation without the second radiation passing through the Device under Test (DUT); and generate a second electrical current based on the first radiation and the second radiation after the second radiation passes through the DUT; and a data processor configured to determine a transfer function of the DUT at the third nominal carrier frequency and the fourth nominal carrier frequency based on the first electrical current and the second electrical current.

20 Claims, 7 Drawing Sheets

(51) Int. Cl.
*H04B 10/07* (2013.01)
*H04B 10/60* (2013.01)

(56) References Cited

U.S. PATENT DOCUMENTS

| | | | | |
|---|---|---|---|---|
| 2016/0065304 | A1* | 3/2016 | Hauske | H04B 10/0775 398/16 |
| 2016/0149637 | A1* | 5/2016 | Marsland, Jr. | H04B 10/63 398/25 |
| 2017/0302390 | A1* | 10/2017 | Entsfellner | H04B 3/46 |

OTHER PUBLICATIONS

Shilong Pan, and Min Xue, "Ultrahigh-resolution optical vector analysis based on optical single-sideband modulation," Journal of Lightwave Technology, vol. 35, No. 4, pp. 836-845, published on Feb. 15, 2017.

* cited by examiner

METHOD AND SYSTEM FOR OPTICAL VECTOR ANALYSIS BASED ON DOUBLE-SIDEBAND MODULATION

CROSS-REFERENCE TO RELATED APPLICATIONS

This application claims priority to Chinese Patent Application No. 201711361767.7, filed on Dec. 18, 2017. The disclosure of the aforementioned application is hereby incorporated by reference in their entireties.

BACKGROUND

1. Technical Field

The present disclosure relates generally to a method and a system related to performing optical vector analysis. In particular, the present disclosure relates to a method and a system suitable for determining a transfer function of an optical device at various operating frequencies.

2. Discussion of Technical Background

Optical vector analysis may be performed to determine a transfer function of an optical device at various operating frequencies of the optical device. The transfer function of the optical device may also be referred to as a transmission response of the optical device, indicating a relationship, caused by the optical device, between an input signal received by the optical device and an output signal outputted by the optical device. The transfer function of the optical device may be further used to determine a plurality of characteristics of the optical device at the various operating frequencies. Examples of the characteristics may include, but not limited to, insertion loss, dispersion, group delay, polarization dependent loss, and polarization mode dispersion.

A traditional method for performing the optical vector analysis on the optical device may be based on a single sideband modulation of an optical signal passing through the optical device. The single sideband modulation may be implemented by performing double sideband modulation on the optical signal, followed by a suitable process for keeping one sideband on one side of each carrier frequency of the optical signal while suppressing the sideband on the other side of the carrier frequency. However, it is extremely difficult to eliminate one of the two sidebands associated with each carrier frequency completely for achieving an ideal single sideband modulation, which results in a limited dynamic range and accuracy for the optical vector analysis. Therefore, there is a need for an improved method and apparatus for performing the optical vector analysis.

SUMMARY

In an embodiment, there is provided an apparatus comprising: an optical signal generator configured to: provide, through a first output port of the optical signal generator, a first radiation comprising a first nominal carrier frequency and a second nominal carrier frequency, the first nominal carrier frequency being different than the second nominal carrier frequency; and provide, through a second output port of the optical signal generator, a second radiation comprising a third nominal carrier frequency and a fourth nominal carrier frequency, the third nominal carrier frequency being different than the fourth nominal carrier frequency, and the second output port of the optical signal generator being configured to be coupled to a Device under Test (DUT); an optical to electrical converter optically coupled to the optical signal generator, wherein the optical to electrical converter is configured to: generate a first electrical current based on the first radiation and the second radiation without the second radiation passing through the DUT; and generate a second electrical current based on the first radiation and the second radiation after the second radiation passes through the DUT; and a data processor configured to determine a transfer function of the DUT at the third nominal carrier frequency and the fourth nominal carrier frequency based on the first electrical current and the second electrical current.

In another embodiment, there is provided a method comprising: providing a first radiation comprising a first nominal carrier frequency and a second nominal carrier frequency, the first nominal carrier frequency being different than the second nominal carrier frequency; and providing a second radiation comprising a third nominal carrier frequency and a fourth nominal carrier frequency, the third nominal carrier frequency being different than the fourth nominal carrier frequency; generating a first electrical current based on the first radiation and the second radiation without the second radiation passing through the DUT; generating a second electrical current based on the first radiation and the second radiation after the second radiation passes through the DUT; and determining a transfer function of the DUT at the third nominal carrier frequency and the fourth nominal carrier frequency based on the first electrical current and the second electrical current.

Other concepts relate to software for performing the optical vector analysis as described herein. A software product, in accord with this concept, includes at least one machine-readable non-transitory medium and information carried by the medium.

In an embodiment, there is provided a machine-readable tangible and non-transitory medium having information, wherein the information, when read by a hardware processor system, causes the hardware processor system to perform following: providing a first radiation comprising a first nominal carrier frequency and a second nominal carrier frequency, the first nominal carrier frequency being different than the second nominal carrier frequency; and providing a second radiation comprising a third nominal carrier frequency and a fourth nominal carrier frequency, the third nominal carrier frequency being different than the fourth nominal carrier frequency; generating a first electrical current based on the first radiation and the second radiation without the second radiation passing through the DUT; generating a second electrical current based on the first radiation and the second radiation after the second radiation passes through the DUT; and determining a transfer function of the DUT at the third nominal carrier frequency and the fourth nominal carrier frequency based on the first electrical current and the second electrical current.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 1:
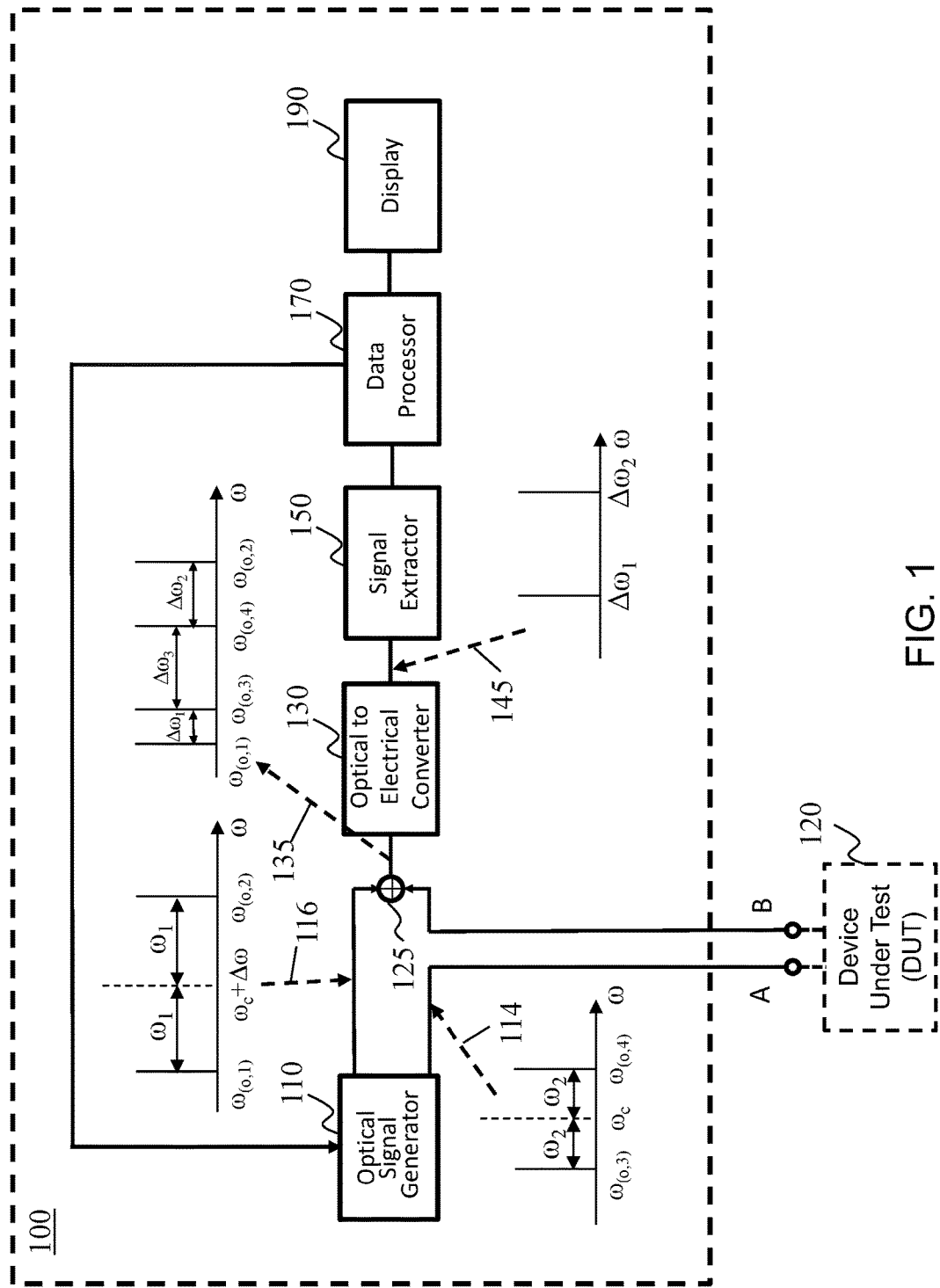
FIG. 1 is a schematic diagram of an optical vector analyzer suitable for performing optical vector analysis on a device under test (DUT) according to an embodiment of the present disclosure.

Referring to FIG. 1, a schematic diagram of an optical vector analyzer 100 is shown according to an embodiment of the disclosure. The optical vector analyzer 100 may be used to perform an optical vector analysis on a device under test (DUT) 120. In particular, the optical vector analyzer 100 may be used to determine a transfer function of the DUT 120 at various operating frequencies. As shown, the optical vector analyzer 100 may comprise an optical signal generator 110, an optical coupler 125, an optical to electrical converter 130, a signal extractor 150, a data processor 170, and a display 190. The various components may be arranged as shown or in any other suitable manner.

The optical signal generator 110 may be configured to provide, through a first output port of the optical signal generator 110, a first radiation. The optical signal generator 110 may be further configured to provide, through a second output port of the optical signal generator 110 denoted by port A as shown in FIG. 1, a second radiation. In operation, the second output port of the optical signal generator 110, i.e., port A, may be coupled to the DUT 120. Alternatively, the second output port of the optical signal generator 110, i.e., port A, may be coupled to the optical coupler 125, through one of the input ports of the optical coupler 125, denoted by port B. More details will be discussed further below.

In an embodiment, each of the first radiation and the second radiation may include at least two frequency carriers. In an embodiment, the at least two frequency carriers are at least two optical frequency carriers. Each frequency carrier is an electromagnetic radiation having a single nominal carrier frequency or a narrow frequency range around a nominal carrier frequency. The nominal carrier frequency of a frequency carrier may be a frequency corresponding to a peak power of the frequency carrier.

Specifically, the first radiation includes a first nominal carrier frequency, denoted by $\omega_{(o,1)}$, and a second nominal carrier frequency, denoted by $\omega_{(o,2)}$. An example of the first radiation is shown in FIG. 1 and directed by arrow 116. As shown, an average of the first nominal carrier frequency and the second nominal carrier frequency, which may be referred to as a first average below, is denoted by $\omega_c + \Delta\omega$, where $\Delta\omega$ is a frequency offset or a frequency shift from a nominal carrier frequency denoted by $\omega_c$. In addition, a difference between the first average and the first nominal carrier frequency and a difference between the first average and the second nominal carrier frequency are equal and are both represented by $\omega_1$.

The second radiation includes a third nominal carrier frequency, denoted by $\omega_{(o,3)}$, and a fourth nominal carrier frequency, denoted by $\omega_{(o,4)}$. An example of the second radiation is shown in FIG. 1 and directed by arrow 114. As shown, an average of the third nominal carrier frequency and the fourth nominal carrier frequency, which may be referred to as a second average below, is denoted by $\omega_c$. In addition, a difference between the second average and the third nominal carrier frequency and a difference between the second average and the fourth nominal carrier frequency are equal and are both represented by $\omega_2$.

In an embodiment, the frequency offset or the frequency shift, $\Delta\omega$ is equal to zero. In an embodiment, the frequency offset or the frequency shift, $\Delta\omega$ is not equal to zero. In an embodiment, the first nominal carrier frequency is equal to the third nominal carrier frequency, as the second nominal carrier frequency is not equal to the fourth nominal carrier frequency, for example, when $\omega_{(o,1)} = \omega_{(o,3)}$ and $\omega_{(o,2)} > \omega_{(o,4)}$, or when $\omega_{(o,1)} = \omega_{(o,3)}$ and $\omega_{(o,2)} < \omega_{(o,4)}$. In an embodiment, the second nominal carrier frequency is equal to the fourth nominal carrier frequency, as the first nominal carrier frequency is not equal to the third nominal carrier frequency, for example, when $\omega_{(o,2)} = \omega_{(o,4)}$ and $\omega_{(o,1)} > \omega_{(o,3)}$, or when $\omega_{(o,2)} = \omega_{(o,4)}$ and $\omega_{(o,1)} < \omega_{(o,3)}$. In an embodiment, the first radiation is the same as the second radiation, for example, when $\omega_{(o,1)} = \omega_{(o,3)}$ and $\omega_{(o,2)} = \omega_{(o,4)}$. In an embodiment, the first radiation is overlapped with the second radiation in frequency, for example, when $\omega_{(o,1)} < \omega_{(o,3)} < \omega_{(o,2)} < \omega_{(o,4)}$, or when $\omega_{(o,1)} < \omega_{(o,3)} < \omega_{(o,4)} < \omega_{(o,2)}$, or when $\omega_{(o,3)} < \omega_{(o,1)} < \omega_{(o,2)} < \omega_{(o,4)}$, or when $\omega_{(o,3)} < \omega_{(o,1)} < \omega_{(o,4)} < \omega_{(o,2)}$. In an embodiment, $\omega_c$, $\Delta\omega$, $\omega_1$, and/or $\omega_2$ may be tunable. In an embodiment, the optical signal generator 110 has an input port coupled to the data processor 170, which may be used to adjust $\omega_c$, $\Delta\omega$, $\omega_1$, and/or $\omega_2$.

The optical coupler 125 may be configured to provide a combined radiation based on the first radiation and the second radiation provided by the optical signal generator 110. Specifically, the optical coupler 125 may be configured to receive, through a first input port of the optical coupler 125, the first radiation, and to receive, through a second input port of the optical coupler 125, i.e., port B in FIG. 1, the second radiation. The optical coupler 125 may be further configured to provide, through an output port of the optical coupler 125, to the optical to electrical converter 130 the combined radiation. When the second output port of the optical signal generator 110, i.e., port A, is coupled to the second input port of the optical coupler 125, i.e., port B, the combined radiation includes both the first radiation and the second radiation without the second radiation passes through the DUT 120. When the second output port of the optical signal generator 110, i.e., port A, is coupled to an input port of the DUT 120 and the second input port of the optical coupler 125, i.e., port B is coupled to an output port of the DUT 120, the combined radiation includes both the first radiation and the second radiation after the second radiation passes through the DUT 120. An example of the combined radiation is shown in FIG. 1 and directed by arrow 135. In this example, the first radiation and the second radiation are overlapped in frequency. In addition, as shown, a difference between the first nominal carrier frequency and the third nominal carrier frequency is denoted by $\Delta\omega_1$ (i.e., $\Delta\omega_1=|\omega_{(o,3)}-\omega_{(o,1)}|$), a difference between the second nominal carrier frequency and the fourth nominal carrier frequency is denoted by $\Delta\omega_2$ (i.e., $\Delta\omega_2=|\omega_{(o,2)}-\omega_{(o,4)}|$), and a difference between the third nominal carrier frequency and the fourth nominal carrier frequency is denoted by $\Delta\omega_3$ (i.e., $\Delta\omega_3=|\omega_{(o,4)}-\omega_{(o,3)}|$). In an embodiment, $\Delta\omega_3 > \Delta\omega_1$ and $\Delta\omega_3 > \Delta\omega_2$.

The optical to electrical converter 130 may be configured to convert the combined radiation to an electrical current upon receipt of the combined radiation. Specifically, the optical to electrical converter 130 may be configured so that the difference between the first nominal carrier frequency and the third nominal carrier frequency, i.e., $\Delta\omega_1$, and the difference between the second nominal carrier frequency and the fourth nominal carrier frequency, i.e., $\Delta\omega_2$, fall within the operating frequency range or the operating frequency bandwidth of the optical to electrical converter 130. As a result, the electrical current includes $\Delta\omega_1$ and $\Delta\omega_2$, as shown in FIG. 1 and directed by arrow 145. Optionally, the optical to electrical converter 130 may be configured so that the electrical current converted from the combined radiation may include one or more additional nominal carrier frequencies in addition to $\Delta\omega_1$ and $\Delta\omega_2$.

The signal extractor 150 may have an input port coupled to the output port of the optical to electrical converter 130 and configured to receive the electrical current. The signal extractor 150 may be configured to measure the electrical current. In particular, the signal extractor 150 may be configured to measure the electrical current by determining amplitudes and phases of each portion of the electrical current corresponding to different nominal carrier frequencies, for example, $\Delta\omega_1$, $\Delta\omega_2$, and optionally, the one or more additional nominal carrier frequencies. For example, the signal extractor 150 may be configured to determine amplitude and phase of a first portion of the electrical current corresponding to the nominal carrier frequency of $\Delta\omega_1$. The signal extractor 150 may be further configured to determine amplitude and phase of a second portion of the electrical current corresponding to the nominal carrier frequency of $\Delta\omega_2$. The signal extractor 150 may further have an output port coupled to an input port of the data processor 170 and configured to output the amplitudes and the phases of the first portion and the second portion of the electrical current corresponding to $\Delta\omega_1$ and $\Delta\omega_2$ to the data processor 170.

The data processor 170 may have the input port coupled to the output port of the signal extractor 150 and configured to receive the measurement results from the signal extractor 150. The data processor 170 may be configured to determine the transfer function of the DUT 120 at various operating frequencies based on the measurement results received from the signal extractor 150. The transfer function of the DUT 120 may also be referred to as a transmission response of the DUT 120. In an embodiment, the transfer function of the DUT 120 may be indicative of a relationship, caused by the DUT 120, between an input signal received by the DUT 120 and a corresponding output signal outputted by the DUT 120. The transfer function of the DUT 120 may further be used to determine a plurality of characteristics of the DUT 120 at the various operating frequencies. Examples of the characteristics may include, but not limited to, insertion loss, dispersion, group delay, polarization dependent loss, and polarization mode dispersion.

Further, the data processor 170, as described above, may be coupled to the optical multiple-carrier generator 310. The data processor 170 may be configured to adjust $\omega_c$, $\Delta\omega$, $\omega_1$, and/or $\omega_2$. In an embodiment, an adjustment with respect to $\omega_1$ is the same as the adjustment with respect to $\omega_2$. In an embodiment, an adjustment with respect to $\omega_1$ is different than the adjustment with respect to $\omega_2$.

The display 190 may have an input port coupled to the output port of the data processor 170 and configured to display the transfer function of the DUT 120, e.g., in forms of showing both amplitude and phase of the transfer function of the DUT 120 and/or the plurality of characteristics of the DUT 120 at various operating frequencies received from and determined by the data processor 170.

In an embodiment, a device characterization process and a system calibration process may be implemented respectively in order to perform the optical vector analysis on the DUT 120. The order of performing the device characterization process and the system calibration process may be interchangeable.

The first radiation provided by the optical signal generator 110 may include, but may not be limited to, the first nominal carrier frequency, $\omega_{(o,1)}$, and the second nominal carrier frequency, $\omega_{(o,2)}$. Accordingly, the electrical field of the first radiation provided by the optical signal generator 110 may be expressed by:

$$E_1(t) = A_{-1} \exp(j\omega_{(o,1)}t) + A_1 \exp(j\omega_{(o,2)}t)+ \quad (1)$$

where $E_1(t)$ is the electrical field of the first radiation provided by the optical signal generator 110, $A_{-1}$ represents an amplitude of the electrical field of the first frequency carrier having the first nominal carrier frequency, $\omega_{(o,1)}$, and $A_1$ represents an amplitude of the electrical field of the second frequency carrier having the second nominal carrier frequency, $\omega_{(o,2)}$.

The second radiation provided by the optical signal generator 110 may include, but may not be limited to, the third nominal carrier frequency, $\omega_{(o,3)}$, and the fourth nominal carrier frequency, $\omega_{(o,4)}$. Accordingly, the electrical field of the second radiation provided by the optical signal generator 110 may be expressed by:

$$E_2(t) = B_{-1} \exp(j\omega_{(o,3)}t) + B_1 \exp(j\omega_{(o,4)}t)+ \quad (2)$$

where $E_2(t)$ is the electrical field of the second radiation provided by the optical signal generator 110, $B_{-1}$ represents an amplitude of the electrical field of the third frequency carrier having the third nominal carrier frequency, $\omega_{(o,3)}$, and $B_1$ represents an amplitude of the electrical field of the fourth frequency carrier having the fourth nominal carrier frequency, $\omega_{(o,4)}$.

When performing the system calibration process, the second output port of the optical signal generator 110, i.e., port A, is coupled to the second input port of the optical coupler 125, i.e., port B directly. As a result, the optical coupler 125 is configured to provide a first combined radiation of the first radiation and the second radiation without the second radiation passing through the DUT 120. Specifically when this occurs, the electrical field of the second radiation received by the second input port of the optical coupler 125, denoted by $E_2'(t)$, may be expressed by:

$$E_2'(t) = B_{-1} \exp(j\omega_{(o,3)}t) H_{SYS}(\omega_{(o,3)}) + B_1 \exp(j\omega_{(o,4)}t) H_{SYS}(\omega_{(o,4)})+ \quad (3)$$

where $H_{SYS}(\omega(o,3))$ is the transfer function of the system (i.e., the optical vector analyzer 100) at the third nominal carrier frequency of ω(o,3), and $H_{SYS}(ω(o,4))$ is the transfer function of the system (i.e., the optical vector analyzer 100) at the fourth nominal carrier frequency of ω(o,4).

Accordingly, the electrical field of the first combined radiation, denoted by $E_{(1)}(t)$, may be expressed by:

$$E_{(1)}(t)=E_1(t)+E_2'(t) \quad (4)$$

Subsequently, the optical to electrical converter 130 may receive the first combined radiation, for example, as shown in FIG. 1 and directed by arrow 135, and convert the first combined radiation to a first electrical current, which may be subsequently measured by the signal extractor 150 through determining the amplitude and the phase of each portion of the first electrical current corresponding to different nominal carrier frequencies, and finally obtained by the data processor 170. Specifically, the first electrical current may include a first portion of the first electrical current having the nominal carrier frequency of $Δω_1=ω(o,3)-ω(o,1)$, which may be expressed by:

$$i_L^{SYS}(Δω_1)=ηB_{-1}H_{SYS}(ω_{(o,3)})A_{-1}{}^*\exp(jΔω_1 t) \quad (5)$$

where $i_L^{SYS}(Δω_1)$ is the first portion of the first electrical current having the nominal carrier frequency of $Δω_1$, η is the responsivity of the optical to electrical converter 130, and $A_{-1}{}^*$ is complex conjugate of the amplitude of the electrical field of the first frequency carrier having the first nominal carrier frequency, $ω_{(o,1)}$.

The first electrical current may further include a second portion of the first electrical current having the nominal carrier frequency of $Δω_2=ω(o,2)-ω(o,4)$, which may be expressed by:

$$i_R^{SYS}(Δω_2)=ηB_1{}^*H_{SYS}{}^*(ω_{(o,4)})A_1 \exp(jΔω_2 t) \quad (6)$$

where $i_R^{SYS}(Δω_2)$ is the second portion of the first electrical current having the nominal carrier frequency of $Δω_2$, $B_1{}^*$ is complex conjugate of the amplitude of the electrical field of the fourth frequency carrier having the first nominal carrier frequency, $ω_{(o,4)}$, and $H_{SYS}{}^*(ω(o,4))$ is complex conjugate of the transfer function of the system (i.e., the optical vector analyzer 100) at the nominal carrier frequency of ω(o,4).

When performing the device characterization process, the second output port of the optical signal generator 110, i.e., port A, is coupled to the input port of the DUT 120, as the second input port of the optical coupler 125, i.e., port B is coupled to the output of the DUT 120. As a result, the optical coupler 125 is configured to provide a second combined radiation of the first radiation and the second radiation after the second radiation passes through the DUT 120. Specifically when this occurs, the electrical field of the second radiation received by the second input port of the optical coupler 125, denoted by $E_2''(t)$, may be expressed by:

$$E_2''(t)=B_{-1}\exp(jω_{(o,3)}t)H(ω_{(o,3)})+B_1\exp(jω_{(o,4)}t)H(ω_{(o,4)})+ \quad (7)$$

where $H(ω(o,3))$ is the transfer function resulting from both the system (i.e., the optical vector analyzer 100) and the DUT 120 at the third nominal carrier frequency of ω(o,3), and $H(ω(o,4))$ is the transfer function resulting from both the system (i.e., the optical vector analyzer 100) and the DUT 120 at the fourth nominal carrier frequency of ω(o,4).

Accordingly, the electrical field of the second combined radiation, denoted by $E_{(1)}(t)$, may be expressed by:

$$E_{(2)}(t)=E_1(t)+E_2''(t) \quad (8)$$

Subsequently, the optical to electrical converter 130 may receive the second combined radiation, and convert the second combined radiation to a second electrical current, which may be subsequently measured by the signal extractor 150 through determining the amplitude and the phase of each portion of the second electrical current corresponding to different nominal carrier frequencies, and finally obtained by the data processor 170. Specifically, the second electrical current may include a first portion of the second electrical current having the nominal carrier frequency of $Δω_1=ω(o,3)-ω(o,1)$, which may be expressed by:

$$i_L(Δω_1)=ηB_{-1}H(ω_{(o,3)})A_{-1}{}^*\exp(jΔω_1 t) \quad (9)$$

where $i_L(Δω_1)$ is the first portion of the second electrical current having the nominal carrier frequency of $Δω_1$.

The second electrical current may further include a second portion of the second electrical current having the nominal carrier frequency of $Δω_2=ω(o,2)-ω(o,4)$, which may be expressed by:

$$i_R(Δω_2)=ηB_1{}^*H^*(ω_{(o,4)})A_1 \exp(jΔω_2 t) \quad (10)$$

where $i_R(Δω_2)$ is the second portion of the second electrical current having the nominal carrier frequency of $Δω_2$, and $H^*(ω(o,4))$ is complex conjugate of the transfer function resulting from both the system (i.e., the optical vector analyzer 100) and the DUT 120 at the nominal carrier frequency of ω(o,4).

The relationship between $H(ω_{(o,3)})$ and $H_{SYS}(ω_{(o,3)})$ may be expressed by:

$$H(ω_{(o,3)})=H_{SYS}(ω_{(o,3)})H_{DUT}(ω_{(o,3)}) \quad (11)$$

where $H_{DUT}(ω_{(o,3)})$ represents the transfer function of the DUT 120 at the third nominal carrier frequency of $ω_{(o,3)}$.

In addition, the relationship between $H^*(ω_{(o,4)})$ and $H^*_{SYS}(ω_{(o,4)})$ may be expressed by:

$$H^*(ω_{(o,4)})=H_{SYS}{}^*(ω_{(o,4)})H_{DUT}{}^*(ω_{(o,4)}) \quad (12)$$

where $H^*_{DUT}(ω_{(o,4)})$ represents the complex conjugate of the transfer function of the DUT 120 at the fourth nominal carrier frequency, $ω_{(o,4)}$.

Upon completion of the system calibration process and the device characterization process, the data processor 170 may be further configured to determine the transfer function of the DUT 120 at the third nominal carrier frequency, $ω_{(o,3)}$, based on equations (5), (9), and (11):

$$H_{DUT}(ω_{(o,3)}) = \frac{i_L(Δω_1)}{i_L^{SYS}(Δω_1))} \quad (13)$$

The data processor 170 may be further configured to make the following determinations based on equation (13):

$$|H_{DUT}(ω_{(o,3)})| = \frac{|i_L(Δω_1)|}{|i_L^{SYS}(Δω_1))|} \quad (14)$$

$$\phi[H_{DUT}(ω_{(o,3)})] = \phi[i_L(Δω_1)] - \phi[i_L^{SYS}(Δω_1)] \quad (15)$$

where $|H_{DUT}(ω_{(o,3)})|$ and $\phi[H_{DUT}(ω_{(o,3)})]$ are amplitude and phase of the transfer function of the DUT at the third nominal carrier frequency, denoted by ω(o,3), respectively, $|i_L^{SYS}(Δω_1)|$ and $\phi[i_L^{SYS}(Δω_1)]$ are amplitude and phase of a first portion of the first electrical current having the nominal carrier frequency of $Δω_1=ω(o,3)-ω(o,1)$, which can be measured by the signal extractor 150 and obtained by the data processor 170 during the system calibration process, $|i_L(Δω_1)|$ and $\phi[i_L(Δω_1)]$ is amplitude and phase of a first portion of the second electrical current having the nominal carrier frequency of $Δω_1=ω(o,3)-ω(o,1)$, which can be measured by the signal extractor 150 and obtained by the data processor 170 during the device characterization process.

In addition, the data processor 170 may be further configured to determine the transfer function of the DUT 120 at the fourth nominal carrier frequency, $\omega_{(o,4)}$, based on equations (6), (10), and (12):

$$H_{DUT}(\omega_{(o,4)}) = \frac{i_R^*(\Delta\omega_2)}{i_R^{SYS*}(\Delta\omega_2))} \qquad (16)$$

where $i_R^{SYS*}(\Delta\omega_2)$ is complex conjugate of the second portion of the first electrical current having the nominal carrier frequency of $\Delta\omega_2$, and $i_R^*(\Delta\omega_2)$ is complex conjugate of the second portion of the second electrical current having the nominal carrier frequency of $\Delta\omega_2$.

The data processor 170 may be further configured to make the following determinations based on equation (16):

$$|H_{DUT}(\omega_{(o,4)})| = \frac{|i_R(\Delta\omega_2)|}{|i_R^{SYS}(\Delta\omega_2)|} \qquad (17)$$

$$\phi[H_{DUT}(\omega_{(o,4)})] = -\phi[i_R(\Delta\omega_2)] + \phi[i_R^{SYS}(\Delta\omega_2)] \qquad (18)$$

where $|H_{DUT}(\omega_{(o,4)})|$ and $\phi[H_{DUT}(\omega_{(o,4)})]$ are amplitude and phase of the transfer function of the DUT at the fourth nominal carrier frequency, denoted by $\omega(o,4)$, respectively, $|i_R^{SYS}(\Delta\omega_2)|$ and $\phi[i_R^{SYS}(\Delta\omega_2)]$ are amplitude and phase of the second portion of the first electrical current having the nominal carrier frequency of $\Delta\omega_2=\omega(o,2)-\omega(o,4)$, which can be measured by the signal extractor 150 and obtained by the data processor 170 during the system calibration process, $|i_R(\Delta\omega_2)|$ and $\phi[i_R(\Delta\omega_2)]$ is amplitude and phase of the second portion of the second electrical current having the nominal carrier frequency of $\Delta\omega_2=\omega(o,2)-\omega(o,4)$, which can be measured by the signal extractor 150 and obtained by the data processor 170 during the device calibration process.

In an embodiment, the first nominal carrier frequency $\omega_{(o,1)}$, the second nominal carrier frequency, $\omega_{(o,2)}$, the third nominal carrier frequency $\omega_{(o,3)}$, and the fourth nominal carrier frequency, $\omega_{(o,4)}$, may be adjusted, for example, by the data processor 170. This is done so that the transfer function of the DUT 120 at various other operating frequencies may be determined accordingly by performing one or more additional sets of the device characterization process and the system calibration process as described above. In an embodiment, the first nominal carrier frequency, $\omega_{(o,1)}$, the second nominal carrier frequency, $\omega_{(o,2)}$, the third nominal carrier frequency $\omega_{(o,3)}$, and the fourth nominal carrier frequency, $\omega_{(o,4)}$, may be adjusted such that the difference between the first nominal carrier frequency, $\omega_{(o,1)}$, and the second nominal carrier frequency, $\omega_{(o,2)}$, may be changed accordingly by the same amount as the difference between the third nominal carrier frequency, $\omega_{(o,3)}$, and the fourth nominal carrier frequency, $\omega\omega_{(o,4)}$, may be changed, i.e., $\Delta(\omega_{(o,2)}-\omega_{(o,1)})=\Delta(\omega_{(o,4)}-\omega_{(o,3)})$.

Figure 2:
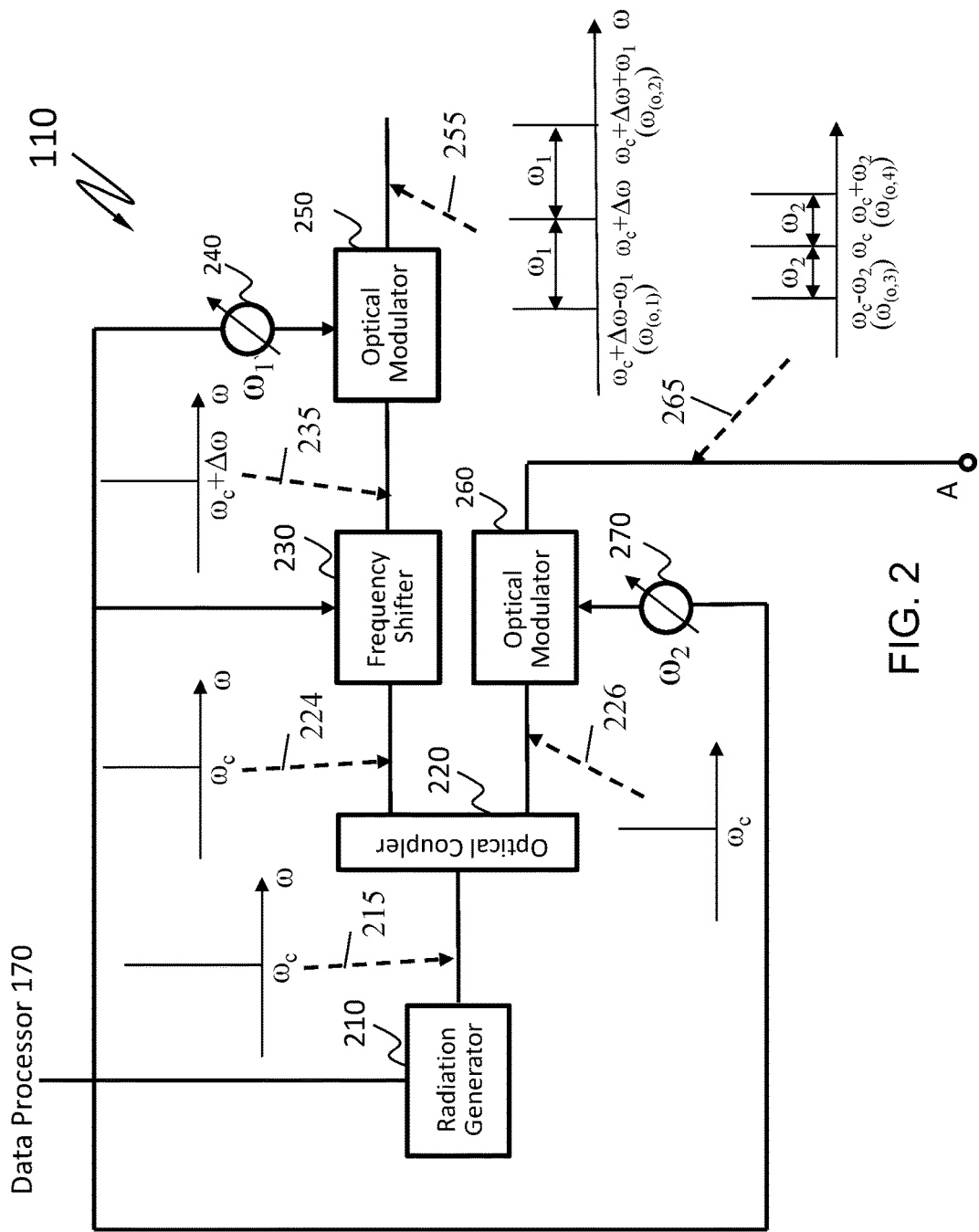
FIG. 2 is a schematic diagram of an optical signal generator according to an embodiment of the present disclosure.

Referring to FIG. 2, a schematic diagram of an embodiment of the optical signal generator 110 is depicted. As shown, the optical signal generator 110 includes a radiation generator 210, an optical coupler 220, a frequency shifter 230, a first optical modulator 250, a first tunable radio-frequency (RF) signal generator 240, a second optical modulator 260, and a second tunable RF signal generator 270.

The radiation generator 210 may be configured to provide an electromagnetic radiation having a nominal carrier frequency, $\omega_c$. An example spectral profile of the electromagnetic radiation provided by the radiation generator 210 is shown in FIG. 2 as directed by arrow 215. The nominal carrier frequency of the electromagnetic radiation, i.e., $\omega_c$, may be tunable. As shown, the radiation generator 210 has an input port coupled to the data processor 170 and configured to receive a control signal from the data processor 170, which may be used to tune the nominal carrier frequency of the electromagnetic radiation, i.e., $\omega_c$. The radiation generator 210 further includes an output port coupled to the optical coupler 220 and configured to output the electromagnetic radiation to the optical coupler 220.

The optical coupler 220 may include an input port configured to receive the electromagnetic radiation provided by the radiation generator 210. The optical coupler 220 may be configured to provide, through a first output port of the optical coupler 220, a first portion of the electromagnetic radiation to the frequency shifter 230. In an embodiment, the first portion of the electromagnetic radiation is a half of the electromagnetic radiation. An example spectral profile of the first portion of the electromagnetic radiation is shown in FIG. 2 and directed by arrow 224.

The frequency shifter 230 includes an input port configured to receive the first portion of the electromagnetic radiation. The frequency shifter 230 may be configured to provide, through an output port of the frequency shifter 230, a shifted radiation to a first optical modulator 250 by providing a frequency shift, denoted by $\Delta\omega$, to the first portion of the electromagnetic radiation. An example spectral profile of the shifted radiation is shown in FIG. 2 and directed by arrow 235. As shown, the shifted radiation has a nominal carrier frequency of $\omega_c+\Delta\omega$. In an embodiment, the frequency shifter 230 may be coupled to the data processor 170, which may be used to tune the frequency shift, $\Delta\omega$.

The first optical modulator 250 may include a first input port coupled to the frequency shifter 230 and configured to receive the shifted radiation from the frequency shifter 230. The first optical modulator 250 may include a second input port configured to receive a first RF signal having a first RF frequency, $\omega_1$ from the first tunable RF signal generator 240. The first optical modulator 250 may be configured to generate the first radiation, as described in FIG. 1, by modulating the first RF frequency, $\omega_1$, on the shifted radiation. In an embodiment, the first optical modulator 250 is a double sideband modulator, which generates a sideband on each side of the nominal carrier frequency, $\omega_c+\Delta\omega$, according to the first RF frequency, $\omega_1$. As a result, the first radiation is shown in FIG. 2 and directed by arrow 255, which includes the nominal carrier frequency of $\omega_c+\Delta\omega$, the first sideband frequency of $\omega_c+\Delta\omega-\omega_1$, and the second sideband frequency of $\omega_c+\Delta\omega+\omega_1$. As such, $\omega_{(o,1)}=\omega_c+\Delta\omega-\omega_1$, and $\omega_{(o,2)}=\omega_c+\Delta\omega+\omega_1$.

The optical coupler 220 may be further configured to provide, through a second output port of the optical coupler 220, a second portion of the electromagnetic radiation to the second optical modulator 260. In an embodiment, the second portion of the electromagnetic radiation is a half of the electromagnetic radiation. An example spectral profile of the second portion of the electromagnetic radiation is shown in FIG. 2 and directed by arrow 226.

The second optical modulator 260 may include a first input port coupled to the optical coupler 220 and configured to receive the second portion of the electromagnetic radiation from the optical coupler 220. The second optical modulator 260 may include a second input port configured to receive a second RF signal having a second RF frequency, $\omega_2$ from the second tunable RF signal generator 270. The second optical modulator 260 may be configured to generate the second radiation, as described in FIG. 1, by modulating the second RF frequency, $\omega_2$, on the second portion of the electromagnetic radiation. In an embodiment, the second optical modulator 260 is a double sideband modulator, which generates a sideband on each side of the nominal carrier frequency, $\omega_c$, according to the second RF frequency, $\omega_2$. As a result, the second radiation is shown in FIG. 2 and directed by arrow 265, which includes the nominal carrier frequency of $\omega_c$, the first sideband frequency of $\omega_c-\omega_2$, and the second sideband frequency of $\omega_c+\omega_2$. As such, $\omega_{(o,3)}=\omega_c-\omega_2$, and $\omega_{(o,4)}=\omega_c+\omega_2$. In an embodiment, the second optical modulator 260 may be further configured to output the second radiation through the output port of the second optical modulator 260. In an embodiment, the output port of the second optical modulator 260 is port A of the optical signal generator 110.

In an embodiment, both the first tunable RF signal generator 240 and the second tunable RF signal generator 270 may be coupled to the data processor 170, which may be used to tune the first RF frequency, $\omega_1$, provided by the first tunable RF signal generator 240, and/or the second RF frequency, $\omega_2$, provided by the second tunable RF signal generator 270. In an embodiment, the first RF frequency, $\omega_1$, may be adjusted by a same amount as the second RF frequency, $\omega_2$, may be adjusted.

Figure 3:
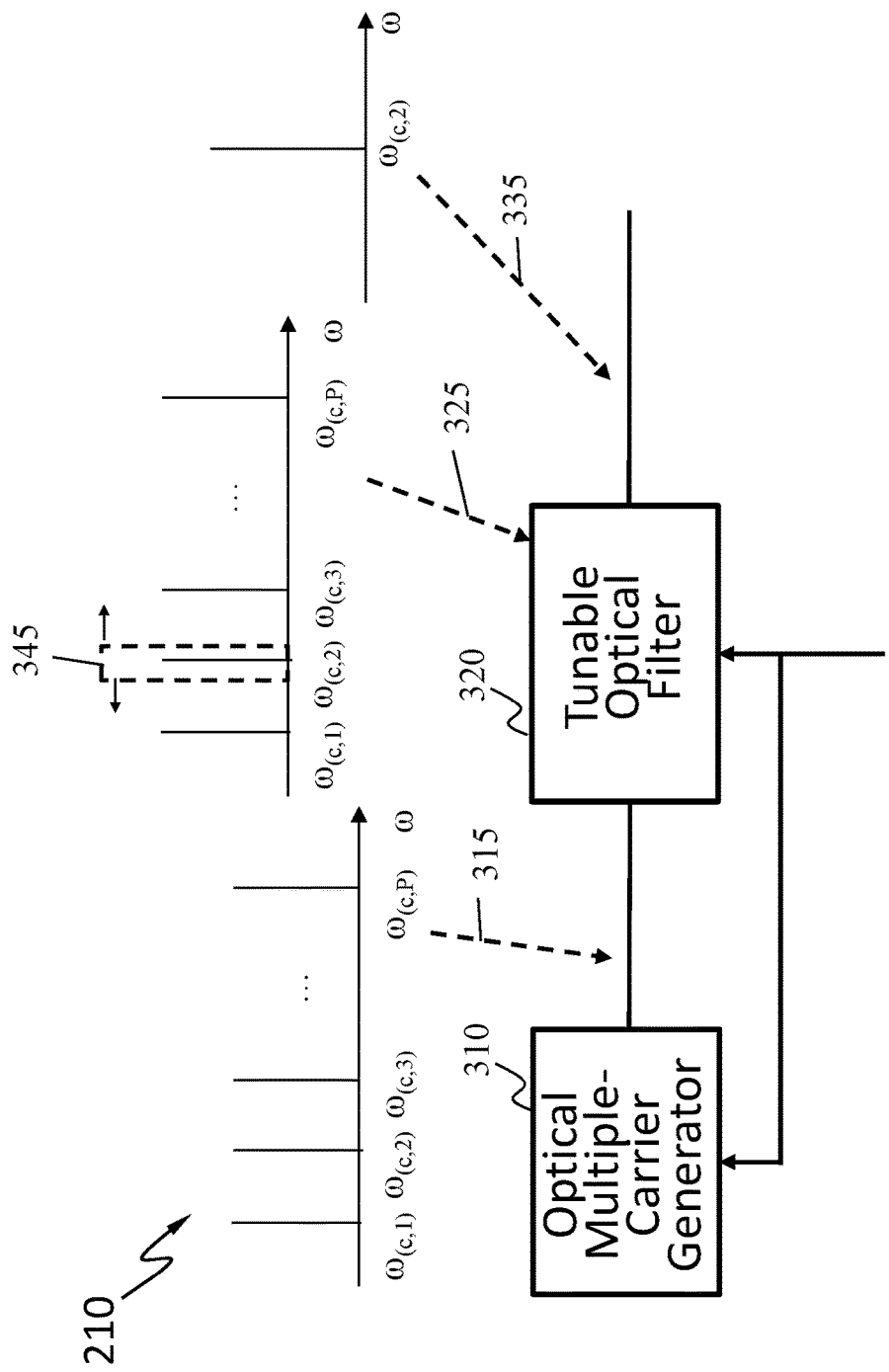
FIG. 3 is a schematic diagram of a radiation generator according to an embodiment of the present disclosure.

Referring to FIG. 3, a schematic diagram of the radiation generator 210 is shown according to an embodiment of the present disclosure. The radiation generator 210 may include an optical multiple-carrier generator 310 and a tunable optical filter 320 coupled to the optical multiple-carrier generator 310.

The optical multiple-carrier generator 310 may be configured to provide a plurality of optical frequency carriers. In an embodiment, the plurality of optical frequency carriers may be equally spaced. In an embodiment, the plurality of optical frequency carriers may not be equally spaced. In some examples, the plurality of optical frequency carriers may have a same amplitude or similar amplitude, resulting in a flat spectral profile. In some other examples, the plurality of optical frequency carriers may have different amplitudes. An example of the plurality of optical frequency carriers is shown in FIG. 3 as directed by arrow 315. As shown, the plurality of optical frequency carriers are represented by $\omega_{(c,1)}, \omega_{(c,2)}, \ldots,$ and $\omega_{(c,P)}$, where P is a positive integer. In an embodiment, the optical multiple-carrier generator 310 may be coupled to the data processor 170, which may be used to adjust one or more nominal carrier frequencies selected from $\omega_{(c,1)}, \omega_{(c,2)}, \ldots,$ and $\omega_{(c,P)}$.

The tunable optical filter 320 may be configured to select one optical frequency carrier from the plurality of optical frequency carriers provided by the optical multiple-carrier generator 310. The tunable optical filter 320 may be further configured to provide the selected optical frequency carrier, e.g., to the optical coupler 220. In an embodiment, the tunable optical filter 320 may be a tunable optical bandpass filter. For example, the tunable optical filter 320, whose spectral profile is denoted as a dashed box 345 in the optical spectral profile as directed by arrow 325, may have an operating frequency at around $\omega_{(c,2)}$ with a predetermined bandwidth. As such, the tunable optical filter 320 may be used to select an optical frequency carrier centered at the nominal carrier frequency of $\omega_{(c,2)}$, while filtering out the other optical frequency carriers. As a result, the tunable optical filter 320 may provide an electromagnetic radiation (i.e., the selected optical frequency carrier) at the nominal carrier frequency of $\omega_{(c,2)}$, as shown and directed by arrow 335, for example, to the optical coupler 220. In an embodiment, the tunable optical filter 320 may be a tunable optical band-stop filter.

In an embodiment, the tunable optical filter 320 may be coupled to the data processor 170, which may be used to control and adjust the operating frequency of the tunable optical filter 320. For example, the operating frequency of the tunable optical filter 320 may be red shifted (e.g., as shown in the leftward arrow) or blue shifted (e.g., as shown in the rightward arrow). This is done so that an optical frequency carrier at another carrier frequency may be selected and provided by the radiation generator 210 to the optical coupler 220 after adjustment.

Figure 4:
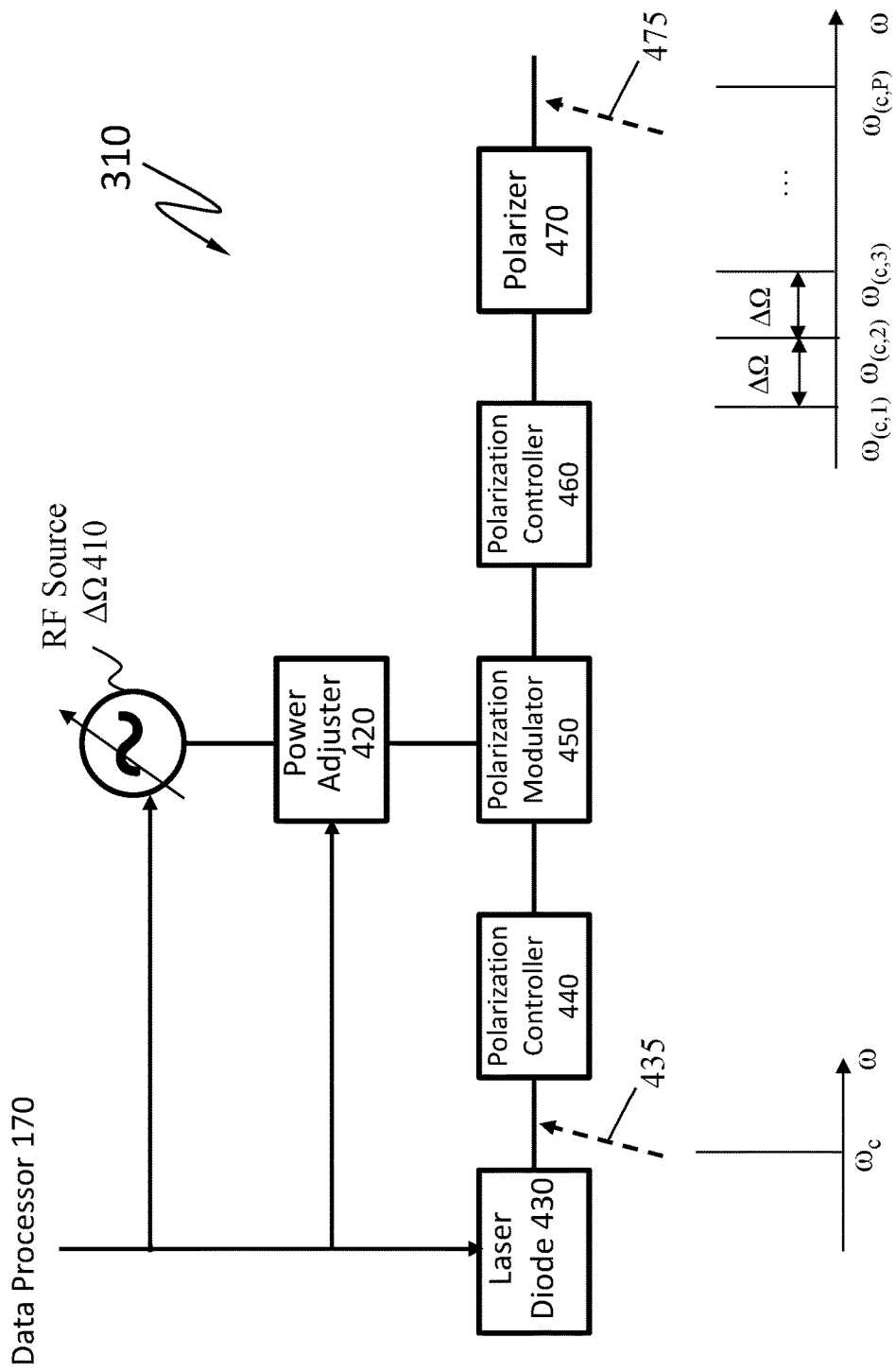
FIG. 4 is a schematic diagram of an embodiment of an optical multiple-carrier generator.

Referring to FIG. 4, a schematic diagram of the optical multiple-carrier generator 310 is shown according to an embodiment of the present disclosure. In this embodiment, the optical multiple-carrier generator 310 may also be referred to as a comb source. As shown, the optical multiple-carrier generator 310 includes a laser diode 430, a first polarization controller 440, an RF source 410, a power adjuster 420, a polarization modulator 450, a second polarization controller 460, and a polarizer 470. The first polarization controller 440 may be similar to the second polarization controller 460. As shown, the laser diode 430, the RF source 410, and/or the power adjuster 420 may be coupled to the data processor 170.

The laser diode 430 may be configured to provide an electromagnetic radiation having a single optical frequency carrier at a nominal carrier frequency of $\omega_c$ (for example, as shown in FIG. 4 and directed by arrow 435). In an embodiment, the laser diode 430 may be a continuous wave laser configured to provide the single optical frequency carrier at the nominal carrier frequency of $\omega_c$ with a narrow bandwidth (or a narrow linewidth). In an embodiment, the nominal carrier frequency of $\omega_c$ may be adjusted by the data processor 170.

The first polarization controller 440 may be coupled to the laser diode 430 and configured to tune the polarization state of the electromagnetic radiation received from the laser diode 430. The first polarization controller 440 may be further configured to output the electromagnetic radiation to the polarization modulator 450 after the polarization state is adjusted.

The polarization modulator 450 may be coupled to the first polarization controller 440 and the power adjuster 420. The polarization modulator 450 may be configured to modulate the polarization of the electromagnetic radiation received from the first polarization controller 440 according to the RF signal received from the power adjuster 420. The polarization modulator 450 may be further configured to provide the electromagnetic radiation after polarization modulation to the second polarization controller 460.

The RF source 410 may be configured to provide an RF signal to the power adjuster 420 at a frequency of $\Delta\Omega$. In an embodiment, the RF source 410 may be coupled to the data processor 170, which may be used to adjust the power and/or the frequency of $\Delta\Omega$.

The power adjuster 420 may be coupled to the RF source 410 and configured to adjust the power of the RF signal provided to the polarization modulator 450. In an embodiment, the power adjuster 420 may comprise a tunable RF amplifier with an adjustable power amplification. In an embodiment, the power adjuster 420 may comprise a tunable RF attenuator with an adjustable power attenuation. In an embodiment, the amount of power amplification and/or power attenuation may be adjusted by the data processor 170.

The second polarization controller 460 may be coupled to the polarization modulator 450 and configured to adjust the polarization state of the electromagnetic radiation received from the polarization modulator 450. The second polarization controller 460 may be further configured to provide the electromagnetic radiation after the polarization state is adjusted to the polarizer 470.

The polarizer 470 may be configured to receive the electromagnetic radiation from the second polarization controller 460 and output a portion of the electromagnetic radiation matching to a predefined polarization. By carefully adjusted the first polarization controller 440, the power adjuster 420, the polarization modulator 450, and the second polarization controller 460, the outputted portion of the electromagnetic radiation may be an optical frequency comb with an equal spacing of $\Delta\Omega$ and a flat spectral profile, for example, as shown in FIG. 4 as directed by arrow 475. In some examples, the optical multiple-carrier generator 310 may comprise more than one polarization modulator 450 to provide a larger number of optical frequency carriers. More details about the optical multiple-carrier generator 310 may be found in Chao He, et. al, "Ultrafast optical frequency comb generated based on cascaded polarization modulators," Optics Letters Vol. 37, No. 18, pages 3834-3836, published on Sep. 15, 2012, which is incorporated by reference in its entirety.

Figure 5:
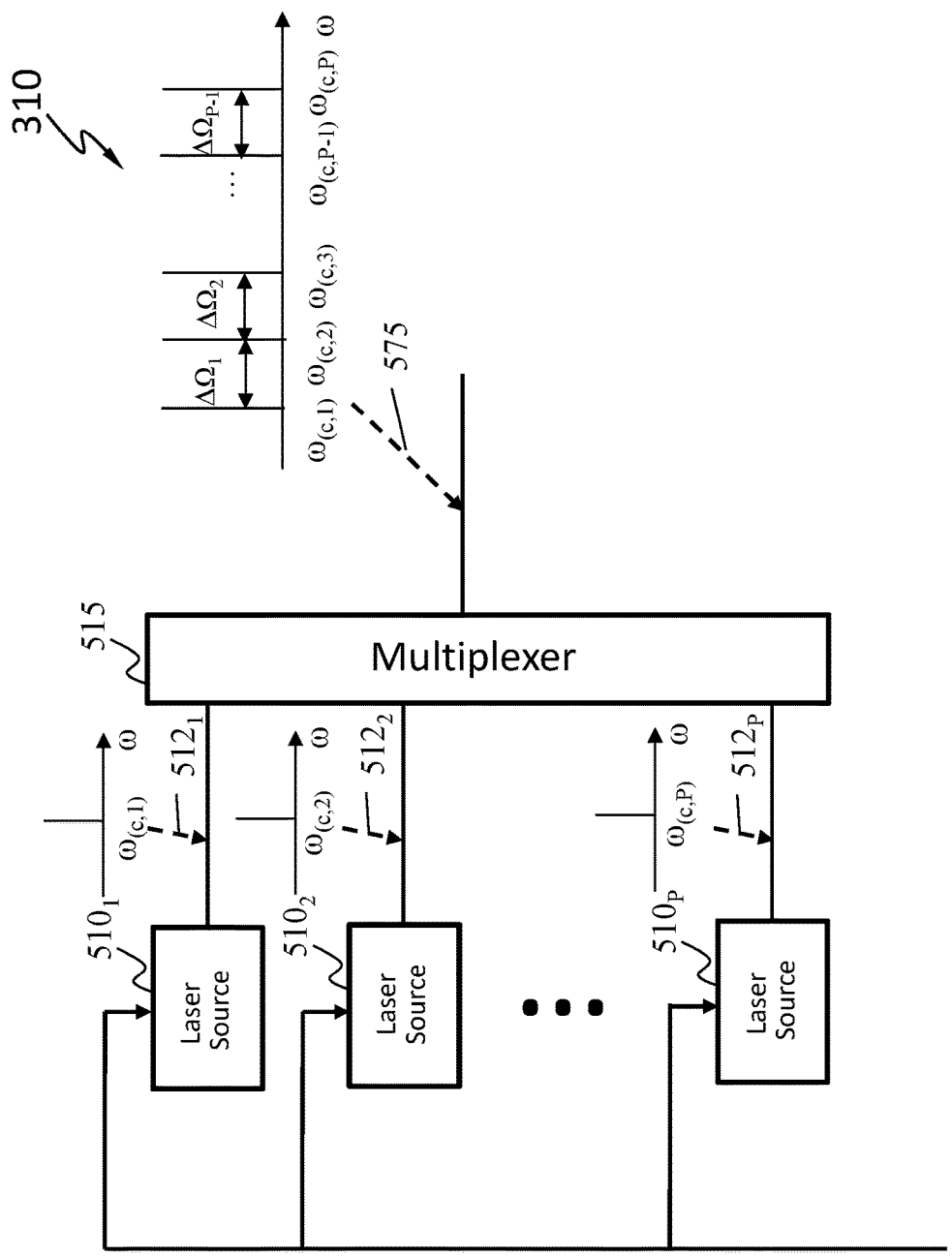
FIG. 5 is a schematic diagram of an embodiment of an optical multiple-carrier generator.

Referring to FIG. 5, a schematic diagram of another embodiment of the optical multiple-carrier generator 310 is depicted. In this embodiment, the optical multiple-carrier generator 310 includes a plurality of laser sources $510_{1, 2, \ldots, P}$. The optical multiple-carrier generator 510 further includes a multiplexer 515 coupled to the plurality of laser sources $510_{1, 2, \ldots, P}$.

Each of the plurality of laser sources $510_{1, 2, \ldots, P}$ may be configured to emit a radiation including one or more optical frequency carriers. In an embodiment, each of the plurality of laser sources $510_{1, 2, \ldots, P}$ may be a continuous wave laser configured to emit a radiation having a different single nominal carrier frequency. For example, the first laser source $510_1$ may, as directed by arrow $512_1$, emit a first radiation having a first nominal carrier frequency, $\omega_{(c,1)}$, the second laser source $510_2$ may, as directed by arrow $512_2$, emit a second radiation having a second nominal carrier frequency, $\omega_{(c,2)}, \ldots$, and the $P_{th}$ laser source $510_P$ may, as directed by arrow $512_P$, emit a $P_{th}$ radiation having a $P_{th}$ nominal carrier frequency, $\omega_{(c,P)}$. In an embodiment, the plurality of laser sources $510_{1, 2, \ldots, P}$ may be coupled to the data processor 170, which may be used to adjust one or more nominal carrier frequencies selected from $\omega_{(c,1)}, \omega_{(c,2)}, \ldots,$ and $\omega_{(c,P)}$.

The multiplexer 515 may include a plurality of input ports coupled to the plurality of laser sources $510_{1, 2, \ldots, P}$ and configured to receive the plurality of radiations, including a plurality of carrier frequencies denoted by $\omega_{(c,1)}, \omega_{(c,2)}, \ldots, \omega_{(c,P)}$, provided by the plurality of laser sources $510_{1, 2, \ldots, P}$. The multiplexer 515 may be further configured to combine the plurality of radiations and output, through an output port of the multiplexer 515, the combined radiation. An example combined radiation is shown in FIG. 5 as directed by arrow 575. As shown, the difference between the first carrier frequency, $\omega_{(c,1)}$ and the second carrier frequency, $\omega_{(c,2)}$ is denoted by $\Delta\omega_1$, the difference between the second carrier frequency, $\omega_{(c,2)}$ and the third carrier frequency, $\omega_{(c,3)}$ is denoted by $\Delta\omega_2$, and so on. In an embodiment, the spacing between adjacent optical frequency carriers in the combined radiation may be equal. In an embodiment, the spacing between adjacent optical frequency carriers in the combined radiation may not be the same. In an embodiment, the multiplexer 515 may be configured by employing a plurality of 2×1 optical fiber combiners.

Figure 6:
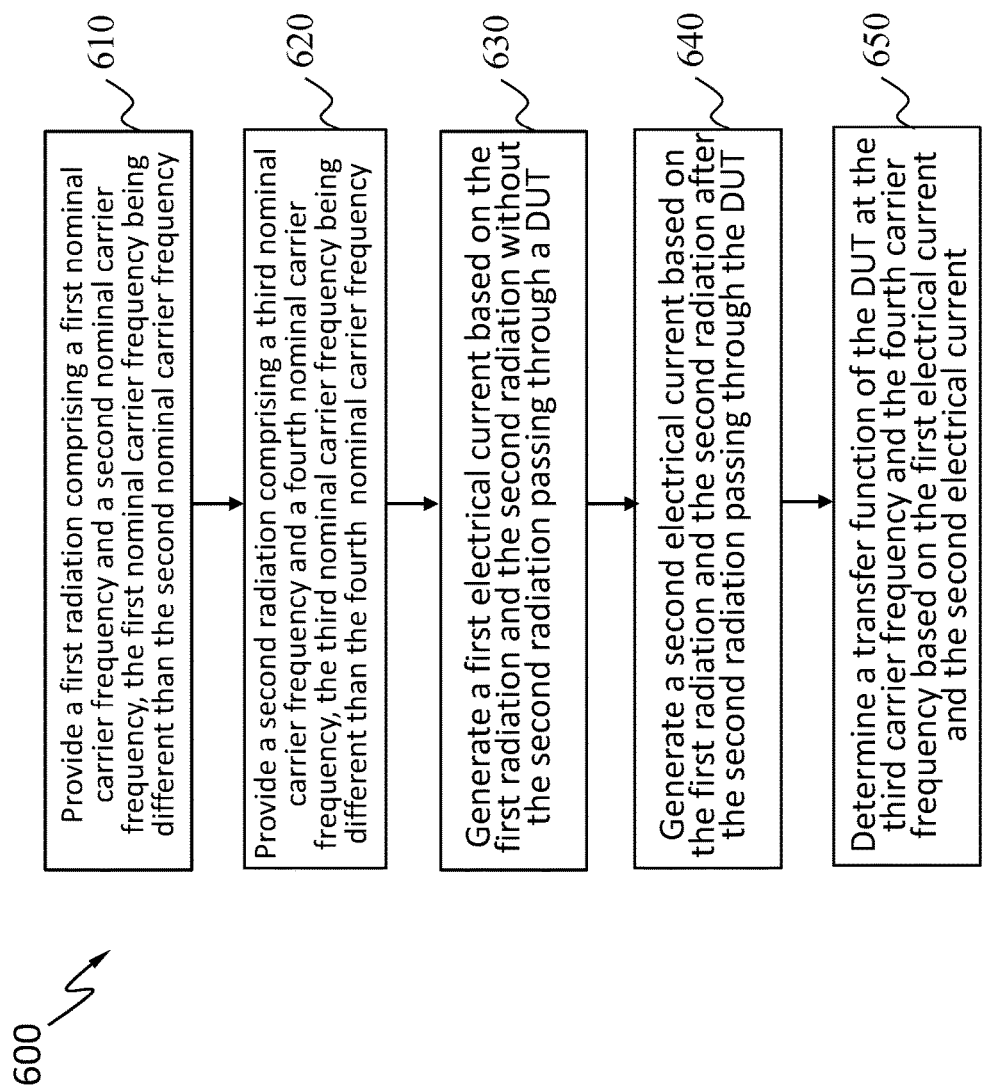
FIG. 6 is a flowchart of an exemplary process for performing an optical vector analysis on a DUT by an optical vector analyzer according to an embodiment of the disclosure.

Referring to FIG. 6, a flowchart 600 of an exemplary process for performing the optical vector analysis on a DUT is shown according to an embodiment of the disclosure. In an embodiment, the example process as shown in the flowchart 600 may be performed by the optical vector analyzers 100.

At step 610, a first radiation comprising a first nominal carrier frequency and a second nominal carrier frequency is provided. The first nominal carrier frequency and the second nominal carrier frequency are different. In an embodiment, the first radiation has, in addition to the first nominal carrier frequency and the second nominal carrier frequency, one or more additional nominal carrier frequencies. In an embodiment, the first radiation is provided by the optical signal generator 110.

At step 620, a second radiation comprising a third nominal carrier frequency and a fourth nominal carrier frequency is provided. The third nominal carrier frequency and the fourth nominal carrier frequency are different. In an embodiment, the second radiation has, in addition to the third nominal carrier frequency and the fourth nominal carrier frequency, one or more additional nominal carrier frequencies. In an embodiment, the second radiation is provided by the optical signal generator 110.

At step 630, a first electrical current is generated based on the first radiation and the second radiation without the second radiation passing through a DUT, e.g., the DUT 120. In an embodiment, the first electrical current may be generated by the optical to electrical converter 130. The step 630 may be performed in a system calibration process, when, as shown in FIG. 1, the second output port, i.e., port A, of the optical signal generator 110 is coupled directly to the second input port, i.e., port B, of the optical coupler 125.

At step 640, a second electrical current is generated based on the first radiation and the second radiation after the second radiation passes through the DUT, e.g., the DUT 120. In an embodiment, the second electrical current may be generated by the optical to electrical converter 130. The step 640 may be performed in a device characterization process, when, as shown in FIG. 1, the second output port, i.e., port A, of the optical signal generator 110 is coupled to the input port of the DUT 120 as the second input port, i.e., port B, of the optical coupler 125 is coupled to the output port of the DUT 120.

At step 650, a transfer function of the DUT, e.g., the DUT 120, is determined at the third nominal carrier frequency and the fourth nominal carrier frequency based on the first electrical current and the second electrical current. In an embodiment, the transfer function of the DUT, e.g., the DUT 120, may be determined by the data processor 170 in FIG. 1 according to equations (13)-(18).

In an embodiment, there is provided an apparatus comprising: an optical signal generator configured to: provide, through a first output port of the optical signal generator, a first radiation comprising a first nominal carrier frequency and a second nominal carrier frequency, the first nominal carrier frequency being different than the second nominal carrier frequency; and provide, through a second output port of the optical signal generator, a second radiation comprising a third nominal carrier frequency and a fourth nominal carrier frequency, the third nominal carrier frequency being different than the fourth nominal carrier frequency, and the second output port of the optical signal generator being configured to be coupled to a DUT; an optical to electrical converter optically coupled to the optical signal generator, wherein the optical to electrical converter is configured to: generate a first electrical current based on the first radiation and the second radiation without the second radiation passing through the DUT; and generate a second electrical current based on the first radiation and the second radiation after the second radiation passes through the DUT; and a data processor configured to determine a transfer function of the DUT at the third nominal carrier frequency and the fourth nominal carrier frequency based on the first electrical current and the second electrical current.

In an embodiment, there is a non-zero difference between a first average of the first nominal carrier frequency and the second nominal carrier frequency and a second average of the third nominal carrier frequency and the fourth nominal carrier frequency.

In an embodiment, both the first electrical current and the second electrical current comprise a fifth nominal carrier frequency and a sixth nominal carrier frequency, wherein the fifth nominal carrier frequency is equal to a first difference between the first nominal carrier frequency and the third nominal carrier frequency, and wherein the sixth nominal carrier frequency is equal to a second difference between the second nominal carrier frequency and the fourth nominal carrier frequency.

In an embodiment, the apparatus further comprises a first optical coupler optically coupled to the optical signal generator and the optical to electrical converter, wherein the first optical coupler is configured to: receive, through a first input of the first optical coupler, the first radiation; receive, through a second input of the first optical coupler, the second radiation; and provide, through an output port of the first optical coupler, a combined radiation of the first radiation and the second radiation to the optical to electrical converter.

In an embodiment, the transfer function of the DUT at the third nominal carrier frequency and the fourth nominal carrier frequency is determined by:

$$|H_{DUT}(\omega_{(o,3)})| = \frac{|i_L(\omega_{(o,5)})|}{|i_L^{SYS}(\omega_{(o,5)})|},$$

$$\phi[H_{DUT}(\omega_{(o,3)})] = \phi[i_L(\omega_{(o,5)})] - \phi[i_L^{SYS}(\omega_{(o,5)})],$$

$$|H_{DUT}(\omega_{(o,4)})| = \frac{|i_R(\omega_{(o,6)})|}{|i_R^{SYS}(\omega_{(o,6)})|}, \text{ and}$$

$$\phi[H_{DUT}(\omega_{(o,4)})] = -\phi[i_R(\omega_{(o,6)})] + \phi[i_R^{SYS}(\omega_{(o,6)})],$$

wherein $|H_{DUT}(\omega_{(o,3)})|$ is an amplitude of the transfer function of the DUT at the third nominal carrier frequency, denoted by $\omega(o,3)$, wherein $|i_L^{SYS}(\omega_{(o,5)})|$ is an amplitude of a first portion of the first electrical current including the fifth nominal carrier frequency, denoted by $\omega(o,5)$, wherein $|i_L(\omega_{(o,5)})|$ is an amplitude of a first portion of the second electrical current including the fifth nominal carrier frequency, denoted by $\omega(o,5)$, wherein $\phi[H_{DUT}(\omega_{(o,3)})]$ is a phase of the transfer function of the DUT at the third nominal carrier frequency, denoted by $\omega(o,3)$, wherein $\phi[i_L^{SYS}(\omega_{(o,5)})]$ is a phase of the first portion of the first electrical current including the fifth nominal carrier frequency, denoted by $\omega(o,5)$, wherein $\phi[i_L(\omega_{(o,5)})]$ is a phase of the first portion of the second electrical current including the fifth nominal carrier frequency, denoted by $\omega(o,5)$, wherein $|H_{DUT}(\omega_{(o,4)})|$ is an amplitude of the transfer function of the DUT at the fourth nominal carrier frequency, denoted by $\omega(o,4)$, wherein $\phi[H_{DUT}(\omega_{(o,4)})]$ is a phase of the transfer function of the DUT at the fourth nominal carrier frequency, denoted by $\omega(o,4)$, wherein $|i_R^{SYS}(\omega_{(o,6)})|$ is an amplitude of a second portion of the first electrical current including the sixth nominal carrier frequency, denoted by $\omega(o,6)$, wherein $|i_R(\omega_{(o,6)})|$ is an amplitude of a second portion of the second electrical current including the sixth nominal carrier frequency, denoted by $\omega(o,6)$, wherein $\phi[i_R^{SYS}(\omega_{(o,6)})]$ is a phase of the second portion of the first electrical current including the sixth nominal carrier frequency, denoted by $\omega(o,6)$, and wherein $\phi[i_R(\omega_{(o,6)})]$ is a phase of the second portion of the second electrical current including the sixth nominal carrier frequency, denoted by $\omega(o,6)$.

In an embodiment, the optical signal generator comprises: a radiation generator configured to emit, through an output port of the radiation generator, a radiation having a nominal carrier frequency denoted by $\omega_c$; a second optical coupler coupled to the radiation generator, the second optical coupler configured to: provide a first portion of the radiation to a frequency shifter; and provide a second portion of the radiation to a first optical modulator; the frequency shifter coupled to the second optical coupler, the frequency shifter being configured to provide a shifted radiation to a second optical modulator by providing a frequency shift, denoted by $\Delta\omega$, to the first portion of the radiation, wherein the frequency shift is equal to the non-zero difference between the first average and the second average; the second optical modulator coupled to the frequency shifter, the second optical modulator being configured to provide the first radiation having the first nominal carrier frequency denoted by $\omega_{(o,1)}$ and the second nominal carrier frequency denoted by $\omega_{(o,2)}$ by modulating the shifted radiation according to a first radio-frequency (RF) signal having a first RF frequency denoted by $\omega_1$; and the first optical modulator coupled to the second optical coupler, the first optical modulator being configured to provide the second radiation having the third nominal carrier frequency denoted by $\omega_{(o,3)}$ and the fourth nominal carrier frequency denoted by $\omega_{(o,4)}$ by modulating the second portion of the radiation according to a second RF signal having a second RF frequency denoted by $\omega_2$, wherein the second RF frequency is different from the first RF frequency.

In an embodiment, the first nominal carrier frequency, the second nominal carrier frequency, the third nominal carrier frequency, and the fourth nominal carrier frequency are determined by: $\omega_{(o,1)} = \omega_c + \Delta\omega - \omega_1, \omega_{(o,2)} = \omega_c + \Delta\omega + \omega_1, \omega_{(o,3)} = \omega_c - \omega_2,$ and $\omega_{(o,4)} = \omega_c + \omega_2$.

In an embodiment, there is provided a method comprising: providing a first radiation comprising a first nominal carrier frequency and a second nominal carrier frequency, the first nominal carrier frequency being different than the second nominal carrier frequency; and providing a second radiation comprising a third nominal carrier frequency and a fourth nominal carrier frequency, the third nominal carrier frequency being different than the fourth nominal carrier frequency; generating a first electrical current based on the first radiation and the second radiation without the second radiation passing through the DUT; generating a second electrical current based on the first radiation and the second radiation after the second radiation passes through the DUT; and determining a transfer function of the DUT at the third nominal carrier frequency and the fourth nominal carrier frequency based on the first electrical current and the second electrical current.

In an embodiment, there is a non-zero difference between a first average of the first nominal carrier frequency and the second nominal carrier frequency and a second average of the third nominal carrier frequency and the fourth nominal carrier frequency.

In an embodiment, both the first electrical current and the second electrical current comprise a fifth nominal carrier frequency and a sixth nominal carrier frequency, wherein the fifth nominal carrier frequency is equal to a first difference between the first nominal carrier frequency and the third nominal carrier frequency, and wherein the sixth nominal carrier frequency is equal to a second difference between the second nominal carrier frequency and the fourth nominal carrier frequency.

In an embodiment, the method further comprises: receiving the first radiation; receiving the second radiation; and provide a combined radiation of the first radiation and the second radiation.

In an embodiment, the transfer function of the DUT at the third nominal carrier frequency and the fourth nominal carrier frequency is determined by:

$$|H_{DUT}(\omega_{(o,3)})| = \frac{|i_L(\omega_{(o,5)})|}{|i_L^{SYS}(\omega_{(o,5)})|},$$

$$\phi[H_{DUT}(\omega_{(o,3)})] = \phi[i_L(\omega_{(o,5)})] - \phi[i_L^{SYS}(\omega_{(o,5)})],$$

$$|H_{DUT}(\omega_{(o,4)})| = \frac{|i_R(\omega_{(o,6)})|}{|i_R^{SYS}(\omega_{(o,6)})|}, \text{ and}$$

$$\phi[H_{DUT}(\omega_{(o,4)})] = -\phi[i_R(\omega_{(o,6)})] + \phi[i_R^{SYS}(\omega_{(o,6)})],$$

wherein $|H_{DUT}(\omega_{(o,3)})|$ is an amplitude of the transfer function of the DUT at the third nominal carrier frequency, denoted by $\omega(o,3)$, wherein $|i_L^{SYS}(\omega_{(o,5)})|$ is an amplitude of a first portion of the first electrical current including the fifth nominal carrier frequency, denoted by $\omega(o,5)$, wherein $|i_L(\omega_{(o,5)})|$ is an amplitude of a first portion of the second electrical current including the fifth nominal carrier frequency, denoted by $\omega(o,5)$, wherein $\phi[H_{DUT}(\omega_{(o,3)})]$ is a phase of the transfer function of the DUT at the third nominal carrier frequency, denoted by $\omega(o,3)$, wherein $\phi[i_L^{SYS}(\omega_{(o,5)})]$ is a phase of the first portion of the first electrical current including the fifth nominal carrier frequency, denoted by $\omega(o,5)$, wherein $\phi[i_L(\omega_{(o,5)})]$ is a phase of the first portion of the second electrical current including the fifth nominal carrier frequency, denoted by $\omega(o,5)$, wherein $|H_{DUT}(\omega_{(o,4)})|$ is an amplitude of the transfer function of the DUT at the fourth nominal carrier frequency, denoted by $\omega(o,4)$, wherein $\phi[H_{DUT}(\omega_{(o,4)})]$ is a phase of the transfer function of the DUT at the fourth nominal carrier frequency, denoted by $\omega(o,4)$, wherein $|i_R^{SYS}(\omega_{(o,6)})|$ is an amplitude of a second portion of the first electrical current including the sixth nominal carrier frequency, denoted by $\omega(o,6)$, wherein $|i_R(\omega_{(o,6)})|$ is an amplitude of a second portion of the second electrical current including the sixth nominal carrier frequency, denoted by $\omega(o,6)$, wherein $\phi[i_R^{SYS}(\omega_{(o,6)})]$ is a phase of the second portion of the first electrical current including the sixth nominal carrier frequency, denoted by $\omega(o,6)$, and wherein $\phi[i_R(\omega_{(o,6)})]$ is a phase of the second portion of the second electrical current including the sixth nominal carrier frequency, denoted by $\omega(o,6)$.

In an embodiment, the method further comprises: emitting a radiation having a nominal carrier frequency denoted by $\omega_c$; providing a first portion of the radiation to a frequency shifter; providing a second portion of the radiation to a first optical modulator; providing a shifted radiation to a second optical modulator by providing a frequency shift, denoted by $\Delta\omega$, to the first portion of the radiation, wherein the frequency shift is equal to the non-zero difference between the first average and the second average; providing the first radiation having the first nominal carrier frequency denoted by $\omega_{(o,1)}$ and the second nominal carrier frequency denoted by $\omega_{(o,2)}$ by modulating the shifted radiation according to a first radio-frequency (RF) signal having a first RF frequency denoted by $\omega_1$; and providing the second radiation having the third nominal carrier frequency denoted by $\omega_{(o,3)}$ and the fourth nominal carrier frequency denoted by $\omega_{(o,4)}$ by modulating the second portion of the radiation according to a second RF signal having a second RF frequency denoted by $\omega_2$, wherein the second RF frequency is different from the first RF frequency.

In an embodiment, the first nominal carrier frequency, the second nominal carrier frequency, the third nominal carrier frequency, and the fourth nominal carrier frequency are determined by: $\omega_{(o,1)}=\omega_c+\Delta\omega-\omega_1$, $\omega_{(o,2)}=\omega_c+\Delta\omega+\omega_1$, $\omega_{(o,3)}=\omega_c-\omega_2$, and $\omega_{(o,4)}=\omega_c+\omega_2$.

In an embodiment, there is provided a machine-readable tangible and non-transitory medium having information, wherein the information, when read by a hardware processor system, causes the hardware processor system to perform following: providing a first radiation comprising a first nominal carrier frequency and a second nominal carrier frequency, the first nominal carrier frequency being different than the second nominal carrier frequency; and providing a second radiation comprising a third nominal carrier frequency and a fourth nominal carrier frequency, the third nominal carrier frequency being different than the fourth nominal carrier frequency; generating a first electrical current based on the first radiation and the second radiation without the second radiation passing through the DUT; generating a second electrical current based on the first radiation and the second radiation after the second radiation passes through the DUT; and determining a transfer function of the DUT at the third nominal carrier frequency and the fourth nominal carrier frequency based on the first electrical current and the second electrical current.

In an embodiment, there is a non-zero difference between a first average of the first nominal carrier frequency and the second nominal carrier frequency and a second average of the third nominal carrier frequency and the fourth nominal carrier frequency.

In an embodiment, both the first electrical current and the second electrical current comprise a fifth nominal carrier frequency and a sixth nominal carrier frequency, wherein the fifth nominal carrier frequency is equal to a first difference between the first nominal carrier frequency and the third nominal carrier frequency, and wherein the sixth nominal carrier frequency is equal to a second difference between the second nominal carrier frequency and the fourth nominal carrier frequency.

In an embodiment, the information, when read by the hardware processor system, further causes the hardware processor system to perform following: receiving the first radiation; receiving the second radiation; and provide a combined radiation of the first radiation and the second radiation.

In an embodiment, the transfer function of the DUT at the third nominal carrier frequency and the fourth nominal carrier frequency is determined by:

$$|H_{DUT}(\omega_{(o,3)})| = \frac{|i_L(\omega_{(o,5)})|}{|i_L^{SYS}(\omega_{(o,5)})|},$$

-continued $$\phi[H_{DUT}(\omega_{(o,3)})] = \phi[i_L(\omega_{(o,5)})] - \phi[i_L^{SYS}(\omega_{(o,5)})],$$

$$|H_{DUT}(\omega_{(o,4)})| = \frac{|i_R(\omega_{(o,6)})|}{|i_R^{SYS}(\omega_{(o,6)})|}, \text{ and}$$

$$\phi[H_{DUT}(\omega_{(o,4)})] = -\phi[i_R(\omega_{(o,6)})] + \phi[i_R^{SYS}(\omega_{(o,6)})],$$

wherein $|H_{DUT}(\omega_{(o,3)})|$ is an amplitude of the transfer function of the DUT at the third nominal carrier frequency, denoted by $\omega(o,3)$, wherein $|i_L^{SYS}(\omega_{(o,5)})|$ is an amplitude of a first portion of the first electrical current including the fifth nominal carrier frequency, denoted by $\omega(o,5)$, wherein $|i_L(\omega_{(o,5)})|$ is an amplitude of a first portion of the second electrical current including the fifth nominal carrier frequency, denoted by $\omega(o,5)$, wherein $\phi[H_{DUT}(\omega_{(o,3)})]$ is a phase of the transfer function of the DUT at the third nominal carrier frequency, denoted by $\omega(o,3)$, wherein $\phi[i_L^{SYS}(\omega_{(o,5)})]$ is a phase of the first portion of the first electrical current including the fifth nominal carrier frequency, denoted by $\omega(o,5)$, wherein $\phi[i_L(\omega_{(o,5)})]$ is a phase of the first portion of the second electrical current including the fifth nominal carrier frequency, denoted by $\omega(o,5)$, wherein $|H_{DUT}(\omega_{(o,4)})|$ is an amplitude of the transfer function of the DUT at the fourth nominal carrier frequency, denoted by $\omega(o,4)$, wherein $\phi[H_{DUT}(\omega_{(o,4)})]$ is a phase of the transfer function of the DUT at the fourth nominal carrier frequency, denoted by $\omega(o,4)$, wherein $|i_R^{SYS}(\omega_{(o,6)})|$ is an amplitude of a second portion of the first electrical current including the sixth nominal carrier frequency, denoted by $\omega(o,6)$, wherein $|i_R(\omega_{(o,6)})|$ is an amplitude of a second portion of the second electrical current including the sixth nominal carrier frequency, denoted by $\omega(o,6)$, wherein $\phi[i_R^{SYS}(\omega_{(o,6)})]$ is a phase of the second portion of the first electrical current including the sixth nominal carrier frequency, denoted by $\omega(o,6)$, and wherein $\phi[i_R(\omega_{(o,6)})]$ is a phase of the second portion of the second electrical current including the sixth nominal carrier frequency, denoted by $\omega(o,6)$, In an embodiment, the information, when read by the hardware processor system, further causes the hardware processor system to perform following: emitting a radiation having a nominal carrier frequency denoted by $\omega_c$; providing a first portion of the radiation to a frequency shifter; providing a second portion of the radiation to a first optical modulator; providing a shifted radiation to a second optical modulator by providing a frequency shift, denoted by $\Delta\omega$, to the first portion of the radiation, wherein the frequency shift is equal to the non-zero difference between the first average and the second average; providing the first radiation having the first nominal carrier frequency denoted by $\omega_{(o,1)}$ and the second nominal carrier frequency denoted by $\omega_{(o,2)}$ by modulating the shifted radiation according to a first radio-frequency (RF) signal having a first RF frequency denoted by $\omega_1$; and providing the second radiation having the third nominal carrier frequency denoted by $\omega_{(o,3)}$ and the fourth nominal carrier frequency denoted by $\omega_{(o,4)}$ by modulating the second portion of the radiation according to a second RF signal having a second RF frequency denoted by $\omega_2$, wherein the second RF frequency is different from the first RF frequency.

Figure 7:
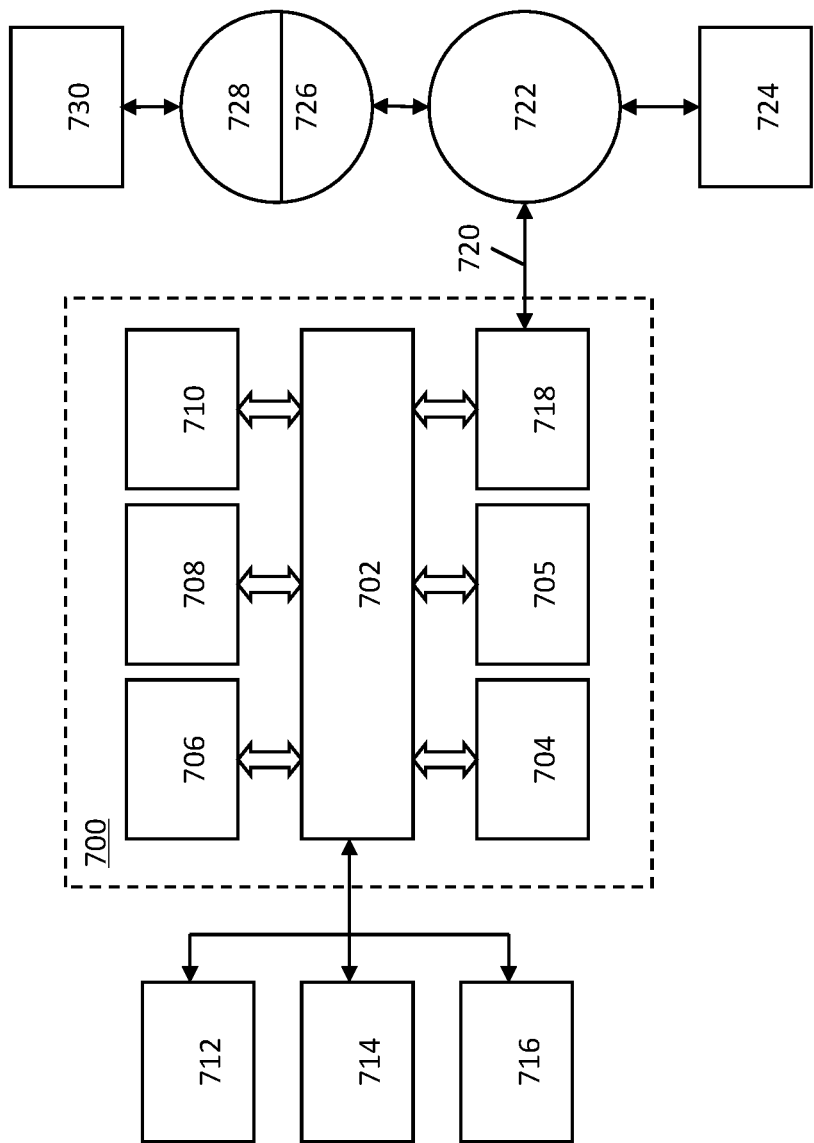
FIG. 7 depicts a general computer architecture on which the present disclosure can be implemented.

Referring to FIG. 7, a computer system 700 is shown. The computer system 700 includes a bus 702 or other communication mechanism to communicate information, and a processor 704 (or multiple processors 704 and 705) coupled with the bus 702 to process information. In an embodiment, the computer system 700 includes a main memory 706, such as a random access memory (RAM) or other dynamic storage device, coupled to the bus 702 to store information and instructions to be executed by the processor 704. The main memory 706 may be used to store temporary variables or other intermediate information during execution of instructions to be executed by the processor 704. In an embodiment, the computer system 700 includes a read only memory (ROM) 708 or other static storage device coupled to the bus 702 to store essentially static information and instructions for the processor 704. In an embodiment, a storage device 710, such as a solid state drive, magnetic disk or optical disk, is provided and coupled to the bus 702 to store information and instructions.

The computer system 700 may be coupled via the bus 702 to a display 712, such as a cathode ray tube (CRT) or flat panel or touch panel display, to display information to a computer user. In an embodiment, an input device 714, including or providing alphanumeric and other keys, is coupled to the bus 702 to communicate information and command selections to the processor 704. Another type of user input device is a cursor controller 716, such as a mouse, a trackball, or cursor direction keys, to communicate direction information and command selections to the processor 704 and to control cursor movement on the display 712. A touch panel (screen) display may also be used as an input device.

The computer system 700 may be suitable to implement methods as described herein in response to the processor 704 executing one or more sequences of one or more instructions contained in, e.g., the main memory 706. Such instructions may be read into the main memory 706 from another computer-readable medium, such as the storage device 710. In an embodiment, execution of sequences of instructions contained in the main memory 706 causes the processor 704 to perform process steps described herein. One or more processors in a multi-processing arrangement may be employed to execute the sequences of instructions contained in the main memory 706. In an embodiment, a hard-wired circuitry may be used in place of or in combination with software instructions. Thus, embodiments are not limited to any specific combination of hardware circuitry and software.

The term "computer-readable medium" as used herein refers to any medium that participates in providing instructions to the processor 704 for execution. Such a medium may take many forms, including but not limited to, non-volatile media, volatile media, and transmission media. Non-volatile media include, for example, solid state, optical or magnetic disks, such as the storage device 710. Volatile media include dynamic memory, such as the main memory 706. Non-volatile and volatile media are considered non-transitory. Non-transitory transmission media include coaxial cables, copper wire and fiber optics, including the wires that comprise the bus 702. Transmission media can also take the form of acoustic or light waves, such as those generated during RF and infrared (IR) data communications. Common forms of computer-readable media include, for example, a floppy disk, hard disk, magnetic tape, any other magnetic medium, a CD-ROM, DVD, any other optical medium, punch cards, paper tapes, any other physical medium with patterns of holes, an RAM, a PROM, and EPROM, a FLASH-EPROM, a solid state disk or any other memory chip or cartridge, a carrier wave as described herein, or any other medium from which a computer can read.

Various forms of computer readable media may be involved in carrying one or more sequences of one or more instructions to the processor 704 for execution. For example, the instructions may initially be borne on a magnetic disk of a remote computer. The remote computer can load the instructions into its dynamic memory and send the instructions over communications medium (e.g., by line or wireless). The computer system 700 can receive the transmitted data and place the data on the bus 702. The bus 702 carries the data to the main memory 706, from which the processor 704 retrieves and executes the instructions. The instructions received by the main memory 706 may optionally be stored on the storage device 710 either before or after execution by the processor 704.

The computer system 700 may also include a communication interface 718 coupled to the bus 702. The communication interface 718 provides a two-way data communication coupling to a network link 720 that is connected to a local network 722. For example, the communication interface 718 may be an integrated services digital network (ISDN) card or a modem to provide a data communication connection to a corresponding type of line. As another example, the communication interface 718 may be a local area network (LAN) card to provide a data communication connection to a compatible LAN. Wireless links may also be implemented. In any such implementation, the communication interface 718 sends and receives electrical, electromagnetic or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP) 726. The ISP 726 in turn provides data communication services through the worldwide packet data communication network, commonly referred to as the internet 728. The local network 722 and the internet 728 both use electrical, electromagnetic or optical signals that carry digital data streams. The signals through the various networks and the signals on the network link 720 and through the communication interface 718, which carry the digital data to and from the computer system 700, are example forms of carrier waves transporting the information.

The computer system 700 can send messages and receive data, including program code, through the network(s), the network link 720, and the communication interface 718. In the internet example, a server 730 might transmit a requested code for an application program through the internet 728, the ISP 726, the local network 722 and the communication interface 718. In accordance with one or more embodiments, one such downloaded application implements a method as described herein. The received code may be executed by the processor 704 as it is received, and/or stored in the storage device 710, or other non-volatile storage for later execution. In this manner, the computer system 700 may obtain application code.

An embodiment may take the form of a computer program containing one or more sequences of machine-readable instructions describing a method as disclosed herein, or a data storage medium (e.g. semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the optical vector analyzer. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according the machine readable instructions of one or more computer programs.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. An apparatus comprising:
   an optical signal generator configured to:
      provide, through a first output port of the optical signal generator, a first radiation comprising a first nominal carrier frequency and a second nominal carrier frequency, the first nominal carrier frequency being different than the second nominal carrier frequency; and
      provide, through a second output port of the optical signal generator, a second radiation comprising a third nominal carrier frequency and a fourth nominal carrier frequency, the third nominal carrier frequency being different than the fourth nominal carrier frequency, and the second output port of the optical signal generator being configured to be coupled to a Device under Test (DUT);
   an optical to electrical converter optically coupled to the optical signal generator, wherein the optical to electrical converter is configured to:
      generate a first electrical current based on the first radiation and the second radiation without the second radiation passing through the DUT; and
      generate a second electrical current based on the first radiation and the second radiation after the second radiation passes through the DUT; and
   a data processor configured to determine a transfer function of the DUT at the third nominal carrier frequency and the fourth nominal carrier frequency based on the first electrical current and the second electrical current, wherein both the first electrical current and the second electrical current comprise a fifth nominal carrier frequency, wherein the fifth nominal carrier frequency is equal to a first difference between the first nominal carrier frequency and the third nominal carrier frequency, wherein the transfer function of the DUT at the third nominal carrier frequency is expressed by:

$$|H_{DUT}(\omega_{(o,3)})| = \frac{|i_L(\omega_{(o,5)})|}{|i_L^{SYS}(\omega_{(o,5)})|},$$

wherein $|H_{DUT}(\omega_{(o,3)})|$ is an amplitude of the transfer function of the DUT at the third nominal carrier frequency, denoted by $\omega(o,3)$, wherein $|i_L^{SYS}(\omega_{(o,5)})|$ is an amplitude of a first portion of the first electrical current including the fifth nominal carrier frequency, denoted by $\omega(o,5)$, and wherein $|i_L(\omega_{(o,5)})|$ is an amplitude of a first portion of the second electrical current including the fifth nominal carrier frequency, denoted by $\omega(o,5)$.

2. The apparatus of claim 1, wherein there is a non-zero difference between a first average of the first nominal carrier frequency and the second nominal carrier frequency and a second average of the third nominal carrier frequency and the fourth nominal carrier frequency.

3. The apparatus of claim 2, wherein both the first electrical current and the second electrical current further comprise a sixth nominal carrier frequency, and wherein the sixth nominal carrier frequency is equal to a second difference between the second nominal carrier frequency and the fourth nominal carrier frequency.

4. The apparatus of claim 3, further comprising a first optical coupler optically coupled to the optical signal generator and the optical to electrical converter, wherein the first optical coupler is configured to:
receive, through a first input of the first optical coupler, the first radiation;
receive, through a second input of the first optical coupler, the second radiation; and
provide, through an output port of the first optical coupler, a combined radiation of the first radiation and the second radiation to the optical to electrical converter.

5. The apparatus of claim 4, wherein the transfer function of the DUT at the third nominal carrier frequency and the fourth nominal carrier frequency is further determined by:

$$\phi[H_{DUT}(\omega_{(o,3)})] = \phi[i_L(\omega_{(o,5)})] - \phi[i_L^{SYS}(\omega_{(o,5)})],$$

$$|H_{DUT}(\omega_{(o,4)})| = \frac{|i_R(\omega_{(o,6)})|}{|i_R^{SYS}(\omega_{(o,6)})|}, \text{ and}$$

$$\phi[H_{DUT}(\omega_{(o,4)})] = -\phi[i_R(\omega_{(o,6)})] + \phi[i_R^{SYS}(\omega_{(o,6)})],$$

wherein $\phi[H_{DUT}(\omega_{(o,3)})]$ is a phase of the transfer function of the DUT at the third nominal carrier frequency, denoted by $\omega(o,3)$, wherein $\phi[i_L^{SYS}(\omega_{(o,5)})]$ is a phase of the first portion of the first electrical current including the fifth nominal carrier frequency, denoted by $\omega(o,5)$, wherein $\phi[i_L(\omega_{(o,5)})]$ is a phase of the first portion of the second electrical current including the fifth nominal carrier frequency, denoted by $w(o,5)$, wherein $|H_{DUT}(\omega_{(o,4)})|$ is an amplitude of the transfer function of the DUT at the fourth nominal carrier frequency, denoted by $\omega(o,4)$, wherein $\phi[H_{DUT}(\omega_{(o,4)})]$ is a phase of the transfer function of the DUT at the fourth nominal carrier frequency, denoted by $\omega(o,4)$, wherein $|i_R^{SYS}(\omega_{(o,6)})|$ is an amplitude of a second portion of the first electrical current including the sixth nominal carrier frequency, denoted by $\omega(o,6)$, wherein $|i_R(\omega_{(o,6)})|$ is an amplitude of a second portion of the second electrical current including the sixth nominal carrier frequency, denoted by $\omega(o,6)$, wherein $\phi[i_R^{SYS}(\omega_{(o,6)})]$ is a phase of the second portion of the first electrical current including the sixth nominal carrier frequency, denoted by $\omega(o,6)$, and wherein $\phi[i_R(\omega_{(o,6)})]$ is a phase of the second portion of the second electrical current including the sixth nominal carrier frequency, denoted by $\omega(o,6)$.

6. The apparatus of claim 5, wherein the optical signal generator comprises:
a radiation generator configured to emit, through an output port of the radiation generator, a radiation having a nominal carrier frequency denoted by $\omega_c$;
a second optical coupler coupled to the radiation generator, the second optical coupler configured to:
provide a first portion of the radiation to a frequency shifter; and
provide a second portion of the radiation to a first optical modulator;
the frequency shifter coupled to the second optical coupler, the frequency shifter being configured to provide a shifted radiation to a second optical modulator by providing a frequency shift, denoted by $\Delta\omega$, to the first portion of the radiation, wherein the frequency shift is equal to the non-zero difference between the first average and the second average;
the second optical modulator coupled to the frequency shifter, the second optical modulator being configured to provide the first radiation having the first nominal carrier frequency denoted by $\omega_{(o,1)}$ and the second nominal carrier frequency denoted by $\omega_{(o,2)}$ by modulating the shifted radiation according to a first radio-frequency (RF) signal having a first RF frequency denoted by $\omega_1$; and
the first optical modulator coupled to the second optical coupler, the first optical modulator being configured to provide the second radiation having the third nominal carrier frequency denoted by $\omega_{(o,3)}$ and the fourth nominal carrier frequency denoted by $\omega_{(o,4)}$ by modulating the second portion of the radiation according to a second RF signal having a second RF frequency denoted by $\omega_2$, wherein the second RF frequency is different from the first RF frequency.

7. The apparatus of claim 6, wherein the first nominal carrier frequency, the second nominal carrier frequency, the third nominal carrier frequency, and the fourth nominal carrier frequency are determined by:
$\omega_{(o,1)} = \omega_c + \Delta\omega - \omega_1$,
$\omega_{(o,2)} = \omega_c + \Delta\omega + \omega_1$,
$\omega_{(o,3)} = \omega_c - \omega_2$, and
$\omega_{(o,4)} = \omega_c + \omega_2$.

8. A method comprising:
providing a first radiation comprising a first nominal carrier frequency and a second nominal carrier frequency, the first nominal carrier frequency being different than the second nominal carrier frequency; and
providing a second radiation comprising a third nominal carrier frequency and a fourth nominal carrier frequency, the third nominal carrier frequency being different than the fourth nominal carrier frequency;

generating a first electrical current based on the first radiation and the second radiation without the second radiation passing through the DUT;

generating a second electrical current based on the first radiation and the second radiation after the second radiation passes through the DUT; and determining a transfer function of the DUT at the third nominal carrier frequency and the fourth nominal carrier frequency based on the first electrical current and the second electrical current, wherein both the first electrical current and the second electrical current comprise a fifth nominal carrier frequency, wherein the fifth nominal carrier frequency is equal to a first difference between the first nominal carrier frequency and the third nominal carrier frequency, wherein the transfer function of the DUT at the third nominal carrier frequency is expressed by:

$$|H_{DUT}(\omega_{(o,3)})| = \frac{|i_L(\omega_{(o,5)})|}{|i_L^{SYS}(\omega_{(o,5)})|},$$

wherein $|H_{DUT}(\omega_{(o,3)})|$ is an amplitude of the transfer function of the DUT at the third nominal carrier frequency, denoted by $\omega(o,3)$, wherein $|i_L^{SYS}(\omega_{(o,5)})|$ is an amplitude of a first portion of the first electrical current including the fifth nominal carrier frequency, denoted by $\omega(o,5)$, and wherein $|i_L(\omega(o,5))|$ is an amplitude of a first portion of the second electrical current including the fifth nominal carrier frequency, denoted by $\omega(o,5)$.

9. The method of claim 8, wherein there is a non-zero difference between a first average of the first nominal carrier frequency and the second nominal carrier frequency and a second average of the third nominal carrier frequency and the fourth nominal carrier frequency.

10. The method of claim 9, wherein both the first electrical current and the second electrical current further comprise a sixth nominal carrier frequency, and wherein the sixth nominal carrier frequency is equal to a second difference between the second nominal carrier frequency and the fourth nominal carrier frequency.

11. The method of claim 10, further comprising:
receiving the first radiation;
receiving the second radiation; and
provide a combined radiation of the first radiation and the second radiation.

12. The method of claim 11, wherein the transfer function of the DUT at the third nominal carrier frequency and the fourth nominal carrier frequency is further determined by:

$$\phi[H_{DUT}(\omega_{(o,3)})] = \phi[i_L(\omega_{(o,5)})] - \phi[i_L^{SYS}(\omega_{(o,5)})],$$

$$|H_{DUT}(\omega_{(o,4)})| = \frac{|i_R(\omega_{(o,6)})|}{|i_R^{SYS}(\omega_{(o,6)})|}, \text{ and}$$

$$\phi[H_{DUT}(\omega_{(o,4)})] = -\phi[i_R(\omega_{(o,6)})] + \phi[i_R^{SYS}(\omega_{(o,6)})],$$

wherein $\phi[H_{DUT}(\omega_{(o,3)})]$ is a phase of the transfer function of the DUT at the third nominal carrier frequency, denoted by $\omega(o,3)$, wherein $\phi[i_L^{SYS}\omega_{(o,5)})]$ is a phase of the first portion of the first electrical current including the fifth nominal carrier frequency, denoted by $\omega(o,5)$, wherein $\phi[i_L(\omega_{(o,5)})]$ is a phase of the first portion of the second electrical current including the fifth nominal carrier frequency, denoted by $\omega(o,5)$, wherein $|H_{DUT}(\omega_{(o,4)})|$ is an amplitude of the transfer function of the DUT at the fourth nominal carrier frequency, denoted by $\omega(o,4)$, wherein $\phi[H_{DUT}(\omega_{(o,4)})]$ is a phase of the transfer function of the DUT at the fourth nominal carrier frequency, denoted by $\omega(o,4)$, wherein $|i_R^{SYS}(\omega_{(o,6)})|$ is an amplitude of a second portion of the first electrical current including the sixth nominal carrier frequency, denoted by $\omega(o,6)$, wherein $|i_R(\omega_{(o,6)})|$ is an amplitude of a second portion of the second electrical current including the sixth nominal carrier frequency, denoted by $\omega(o,6)$, wherein $\phi[i_R^{SYS}(\omega_{(o,6)})]$ is a phase of the second portion of the first electrical current including the sixth nominal carrier frequency, denoted by $w(o,6)$, and wherein $\phi[i_R(\omega_{(o,6)})]$ is a phase of the second portion of the second electrical current including the sixth nominal carrier frequency, denoted by $\omega(o,6)$.

13. The method of claim 12, further comprising:
emitting a radiation having a nominal carrier frequency denoted by $\omega_c$;
providing a first portion of the radiation to a frequency shifter;
providing a second portion of the radiation to a first optical modulator;
providing a shifted radiation to a second optical modulator by providing a frequency shift, denoted by $\Delta\omega$, to the first portion of the radiation, wherein the frequency shift is equal to the non-zero difference between the first average and the second average;
providing the first radiation having the first nominal carrier frequency denoted by $\omega_{(o,1)}$ and the second nominal carrier frequency denoted by $\omega_{(o,2)}$ by modulating the shifted radiation according to a first radio-frequency (RF) signal having a first RF frequency denoted by $\omega_1$; and
providing the second radiation having the third nominal carrier frequency denoted by $\omega_{(o,3)}$ and the fourth nominal carrier frequency denoted by $\omega_{(o,4)}$ by modulating the second portion of the radiation according to a second RF signal having a second RF frequency denoted by $\omega_2$, wherein the second RF frequency is different from the first RF frequency.

14. The method of claim 13, wherein the first nominal carrier frequency, the second nominal carrier frequency, the third nominal carrier frequency, and the fourth nominal carrier frequency are determined by:

$\omega_{(o,1)} = \omega_c + \Delta\omega - \omega_1$,
$\omega_{(o,2)} = \omega_c + \Delta\omega + \omega_1$,
$\omega_{(o,3)} = \omega_c - \omega_2$, and
$\omega_{(o,4)} = \omega_c + \omega_2$.

15. A machine-readable tangible and non-transitory medium having information, wherein the information, when read by a hardware processor system, causes the hardware processor system to perform following:
providing a first radiation comprising a first nominal carrier frequency and a second nominal carrier frequency, the first nominal carrier frequency being different than the second nominal carrier frequency; and
providing a second radiation comprising a third nominal carrier frequency and a fourth nominal carrier frequency, the third nominal carrier frequency being different than the fourth nominal carrier frequency;

generating a first electrical current based on the first radiation and the second radiation without the second radiation passing through the DUT;

generating a second electrical current based on the first radiation and the second radiation after the second radiation passes through the DUT; and determining a transfer function of the DUT at the third nominal carrier frequency and the fourth nominal carrier frequency based on the first electrical current and the second electrical current, wherein both the first electrical current and the second electrical current comprise a fifth nominal carrier frequency, wherein the fifth nominal carrier frequency is equal to a first difference between the first nominal carrier frequency and the third nominal carrier frequency, wherein the transfer function of the DUT at the third nominal carrier frequency is expressed by:

$$|H_{DUT}(\omega_{(o,3)})| = \frac{|i_L(\omega_{(o,5)})|}{|i_L^{SYS}(\omega_{(o,5)})|},$$

wherein $|H_{DUT}(\omega_{(o,3)})|$ is an amplitude of the transfer function of the DUT at the third nominal carrier frequency, denoted by $\omega(o,3)$, wherein $|i_L^{SYS}(\omega_{(o,5)})|$ is an amplitude of a first portion of the first electrical current including the fifth nominal carrier frequency, denoted by $\omega(o,5)$, and wherein $|i_L(\omega_{(o,5)})|$ is an amplitude of a first portion of the second electrical current including the fifth nominal carrier frequency, denoted by $\omega(o,5)$.

16. The machine-readable tangible and non-transitory medium of claim 15, wherein there is a non-zero difference between a first average of the first nominal carrier frequency and the second nominal carrier frequency and a second average of the third nominal carrier frequency and the fourth nominal carrier frequency.

17. The machine-readable tangible and non-transitory medium of claim 16, wherein both the first electrical current and the second electrical current further comprise a sixth nominal carrier frequency, and wherein the sixth nominal carrier frequency is equal to a second difference between the second nominal carrier frequency and the fourth nominal carrier frequency.

18. The machine-readable tangible and non-transitory medium of claim 17, wherein the information, when read by the hardware processor system, further causes the hardware processor system to perform following:

receiving the first radiation;

receiving the second radiation; and provide a combined radiation of the first radiation and the second radiation.

19. The machine-readable tangible and non-transitory medium of claim 18, wherein the transfer function of the DUT at the third nominal carrier frequency and the fourth nominal carrier frequency is further determined by:

$$\phi[H_{DUT}(\omega_{(o,3)})] = \phi[i_L(\omega_{(o,5)})] - \phi[i_L^{SYS}(\omega_{(o,5)})],$$

$$|H_{DUT}(\omega_{(o,4)})| = \frac{|i_R(\omega_{(o,6)})|}{|i_R^{SYS}(\omega_{(o,6)})|}, \text{ and}$$

$$\phi[H_{DUT}(\omega_{(o,4)})] = -\phi[i_R(\omega_{(o,6)})] + \phi[i_R^{SYS}(\omega_{(o,6)})],$$

wherein $\phi[H_{DUT}(\omega_{(o,3)})]$ is a phase of the transfer function of the DUT at the third nominal carrier frequency, denoted by $\omega(o,3)$, wherein $\phi[i_L^{SYS}(\omega_{(o,5)})]$ is a phase of the first portion of the first electrical current including the fifth nominal carrier frequency, denoted by $\omega(o,5)$, wherein $\phi[i_L(\omega_{(o,5)})]$ is a phase of the first portion of the second electrical current including the fifth nominal carrier frequency, denoted by $\omega(o,5)$, wherein $|H_{DUT}(\omega_{(o,4)})|$ is an amplitude of the transfer function of the DUT at the fourth nominal carrier frequency, denoted by $\omega(o,4)$, wherein $\phi[H_{DUT}(\omega_{(o,4)})]$ is a phase of the transfer function of the DUT at the fourth nominal carrier frequency, denoted by $\omega(o,4)$, wherein $|i_R^{SYS}(\omega_{(o,6)})|$ is an amplitude of a second portion of the first electrical current including the sixth nominal carrier frequency, denoted by $\omega(o,6)$, wherein $|i_R(\omega_{(o,6)})|$ is an amplitude of a second portion of the second electrical current including the sixth nominal carrier frequency, denoted by $\omega(o,6)$, wherein $\phi[i_R^{SYS}(\omega_{(o,6)})]$ is a phase of the second portion of the first electrical current including the sixth nominal carrier frequency, denoted by $\omega(o,6)$, and wherein $\phi[i_R(\omega_{(o,6)})]$ is a phase of the second portion of the second electrical current including the sixth nominal carrier frequency, denoted by $\omega(o,6)$.

20. The machine-readable tangible and non-transitory medium of claim 17, wherein the information, when read by the hardware processor system, further causes the hardware processor system to perform following:

emitting a radiation having a nominal carrier frequency denoted by $\omega_c$;

providing a first portion of the radiation to a frequency shifter;

providing a second portion of the radiation to a first optical modulator;

providing a shifted radiation to a second optical modulator by providing a frequency shift, denoted by $\Delta\omega$, to the first portion of the radiation, wherein the frequency shift is equal to the non-zero difference between the first average and the second average;

providing the first radiation having the first nominal carrier frequency denoted by $\omega_{(o,1)}$ and the second nominal carrier frequency denoted by $\omega_{(o,2)}$ by modulating the shifted radiation according to a first radio-frequency (RF) signal having a first RF frequency denoted by $\omega_1$; and providing the second radiation having the third nominal carrier frequency denoted by $\omega_{(o,3)}$ and the fourth nominal carrier frequency denoted by $\omega_{(o,4)}$ by modulating the second portion of the radiation according to a second RF signal having a second RF frequency denoted by $\omega_2$, wherein the second RF frequency is different from the first RF frequency.

* * * * *